United States Patent
Weisgerber

(10) Patent No.: US 11,159,764 B2
(45) Date of Patent: Oct. 26, 2021

(54) CALIBRATION STEP FOR USE IN CONNECTION WITH METHOD AND SYSTEM FOR CREATING WIDE-SCREEN PICTURE-DOMINANCE EFFECT IN A CONVENTIONAL MOTION-PICTURE THEATER

(71) Applicant: Robert C. Weisgerber, New York, NY (US)

(72) Inventor: Robert C. Weisgerber, New York, NY (US)

( * ) Notice: Subject to any disclaimer, the term of this patent is extended or adjusted under 35 U.S.C. 154(b) by 0 days.

(21) Appl. No.: 17/300,017

(22) Filed: Feb. 10, 2021

(65) Prior Publication Data

US 2021/0227172 A1    Jul. 22, 2021

Related U.S. Application Data

(60) Division of application No. 15/932,978, filed on Jun. 4, 2018, now Pat. No. 10,924,717, which is a continuation-in-part of application No. 14/999,089, filed on Mar. 29, 2016, now abandoned.

(51) Int. Cl.
*H04N 7/01* (2006.01)
*H04N 5/262* (2006.01)

(52) U.S. Cl.
CPC ......... *H04N 7/0122* (2013.01); *H04N 5/2628* (2013.01)

(58) Field of Classification Search
CPC .. H04N 5/2628; H04N 7/0122; H04N 9/3185; H04N 9/3161; H04N 13/0459; G03B 21/606; G06T 3/005

USPC ................................................. 348/445, 745
See application file for complete search history.

(56) References Cited

U.S. PATENT DOCUMENTS

| | | | |
|---|---|---|---|
| 2,792,746 A | 5/1957 | O'Brien | |
| 3,475,086 A | 10/1969 | Vetter | |
| 5,121,977 A | 6/1992 | Weisgerber | |
| 7,106,411 B2 | 9/2006 | Read et al. | |
| 8,421,991 B2 | 7/2013 | Read et al. | |
| 9,277,169 B2 | 3/2016 | Weisgerber | |
| 9,797,150 B1* | 10/2017 | Warren | E04H 3/22 |
| 2008/0062164 A1* | 3/2008 | Bassi | H04N 9/3194 345/214 |
| 2008/1006216 | 3/2008 | Bassi et al. | |

(Continued)

OTHER PUBLICATIONS

Vetter: Promotional material for D-150 system (app at 12-13.

(Continued)

*Primary Examiner* — Brian P Yenke
*Assistant Examiner* — Omer Khalid
(74) *Attorney, Agent, or Firm* — David Peter Alan

(57) ABSTRACT

A calibration step is disclosed for use with a system and a method for creating a wide-screen picture-dominance effect in an auditorium located in a motion-picture theater. This is accomplished by an operator viewing a test image or images of horizontal and vertical lines projected onto a deeply-curved screen in said auditorium and adjusting the projection of said test image or images until the horizontal and vertical lines in said image or images appear straight and orthonormal, with the result that viewers watching motion pictures in said auditorium will observe images that appear wider than the physical confines of the auditorium in said theater.

4 Claims, 12 Drawing Sheets

(56) References Cited

U.S. PATENT DOCUMENTS

2009/0021162 A1     1/2009   Cope et al.
2012/0098941 A1     4/2012   Joseph et al.

OTHER PUBLICATIONS

The Miracle of Todd/AO; promotional film with video version found on You Tube (app. at 4).
Marques, Gukian & Taylor: Compound Curve Multi-Format Screen Design at www.in70mm.com (2007)(app. at 30).
Petrozzo & Singer: Cinema Projection Distortion, published by SMPTE and can be found at http://ieeexplore/ieee.org/xpl/mostRecentIssue.jsp?punumber=7266011 (app. at 9).

\* cited by examiner

CALIBRATION STEP FOR USE IN CONNECTION WITH METHOD AND SYSTEM FOR CREATING WIDE-SCREEN PICTURE-DOMINANCE EFFECT IN A CONVENTIONAL MOTION-PICTURE THEATER

This application is a division of application Ser. No. 15/932,978, filed Jun. 4, 2018 and issuing as U.S. Pat. No. 10,924,717 on Feb. 16, 2021, which is a continuation-in-part of application Ser. No. 14/999,089, filed Mar. 29, 2016 and now abandoned. This application claims the non-elected species from that application. The subject matter of this application is a step for calibrating the system disclosed in the prior and application, which is also used in the method disclosed in that application. Beyond this paragraph, the specification and drawings in this application are identical to those of the prior application. The four claims in this application were previously presented as claims 35-38 in the prior application, and were withdrawn from consideration during prosecution of that application, with the intention that they would again be presented here.

FIELD OF THE INVENTION

This invention relates to theatrical exhibition of motion pictures; a method and system for exhibiting such motion pictures through digital projection onto a wide curved screen, which delivers an effect of picture dominance on the viewers of the motion pictures exhibited, such that the invention delivers the full benefit of the aspect ratio in which the image is displayed, with the image appearing wider than the auditorium in which it is shown. In addition, the invention corrects for projected image distortion while delivering a presentation customized to the theater in which it is installed. It is suitable for all aspect ratios and accommodates changes in aspect ratio during a presentation.

BACKGROUND OF THE INVENTION

This invention delivers an immersive "virtual reality" presentation comparable to advanced motion-picture exhibition systems of the past, such as Cinerama, but without the drawbacks of such systems. It can be adapted to the geometry of most multiplex motion picture auditoriums, while delivering an immersive experience to the audience. It uses a curved screen, from floor-to-ceiling in height, and the radius of the screen is adaptable to the geometric restrictions of the front wall of the auditorium (as viewed by the audience) where the invention is installed. In this manner, motion pictures designed for presentation with aspect ratios from 1.33:1 to 2.76:1, can be exhibited on a wall-to-wall and floor-to ceiling curved screen in a conventional theater that would otherwise be too narrow to accommodate wide-screen motion-picture formats in their native aspect ratios.

This invention delivers an immersive effect superior to these historic systems, which were technically-advanced at the time they were introduced. The present invention is designed for installation in existing auditoriums which previously were not suitable for wide-screen exhibition. Once installed, the invention delivers the sort of immersive presentation that was never available in such auditoriums before, and at a superior level of performance. In effect, the invention described here delivers an immersive experience that could not have been achieved in auditoriums that were not originally constructed for the purpose, as shall be described. In the practice of the invention, the picture seen by the audience appears wider than the physical width of the auditorium in which it is displayed.

Throughout much of the history of motion pictures, there have been several technically-advanced systems and methods of motion picture exhibition that have attempted to give audiences the impression that they are immersed in the action of a motion picture, rather than merely watching it from afar. During the 1950's, curved screens were introduced as part of a new cinema experience. The aspect ratio of these wide-screen systems varied from about 2.20:1 to 2.76:1, depending on the film process being employed. These systems had many different names and formats; the most effective at delivering such an immersive and panoramic experience were Cinerama and Todd-AO, with screens that were 95 feet (29 meters) wide or more, with chord depths of fourteen feet (4.3 meters) or more. These panoramic screens engulfed the audiences with a totally immersive experience. As a result, movie-goers demanded that more films be made and presented in these formats, as indicated by the significant box office receipts which those films earned.

Cinerama, first developed in the early 1950s, used a deeply-curved screen and three synchronized projectors to deliver an extremely wide (2.59:1 aspect ratio) presentation to audiences. While many viewers were impressed with the immersive character of the Cinerama experience, the process also had drawbacks. The exhibition system was expensive to install and operate, so not many venues were equipped to show films in Cinerama. It was also technically complex, since the picture was displayed by three synchronized 35 mm projectors. This caused such objectionable artifacts as uneven screen brightness and image appearance along the join lines. Only nine motion pictures were produced in the original three-strip Cinerama format. While it is almost impossible to see a motion picture in that original format today, the extreme width of the Cinerama image shown on a deeply-curved screen has left its mark.

The Todd-AO system (optical projection and printing methods taught by O'Brien: U.S. Pat. No. 2,792,746) represented an advance in wide-screen picture dominance with a single 70 mm film strip, as opposed to the three-strip 35 mm Cinerama system. Todd-AO featured a wide image (aspect ratio 2.20:1), using the entire surface area of the film, except for the sound track. It initially photographed and displayed films at thirty frames-per-second, rather than the conventional twenty-four, using separate cameras for the two frame rates. This resulted in an improved presentation at thirty frames-per-second, but only two films were produced through that method and at that frame rate. Later, Todd-AO was re-scaled to twenty-four frames-per-second for compatibility with standard 35 mm projectors exhibiting printdowns from the original 65 mm negatives. The original wide-screen Todd-AO installations also included a deeply-curved screen, which emulated the Cinerama screen to deliver an immersive audience experience that was unrivaled, compared to conventional motion-picture exhibition.

A promotional film for Todd-AO entitled The Miracle of Todd-AO opened with these words: "Todd-AO is the revolutionary new film process whose new screen, new sound, new projectors and new method of photography let you become a participant in every scene." While the Todd-AO system produced an immersive experience with its large curved screen and high frame rate, it was not widely adopted, but remains a significant benchmark in cinematic history.

Other systems of the 1950s produced wide-screen images, but they were displayed at different aspect ratios. Cinema- Scope squeezed images onto conventional 35 mm film through anamorphic compression when they were photographed. These images were un-squeezed when projected, which delivered a wide-screen presentation with an aspect ratio of 2.55:1 initially, and later finalized at 2.40:1. Ultra Panavision-70 went even further, anamorphically compressing images with a maximum aspect ratio of 2.76:1 onto 65 mm camera-film stock, and expanding them on projection through another anamorphic lens to 2.66:1. Recently, a feature film entitled The Hateful Eight was photographed in Ultra Panavision-70, using vintage equipment. While this throwback to an earlier era may eventually be remembered as an important event in cinematic history, it also may remain only a novelty that cannot be exhibited on a significant scale in that floor-to-ceiling wide-screen format. Moreover, the immersive panoramic wide-screen effect is lost when the motion picture is later shown on home or personal-display media. This diminishes the immersive effect and, therefore, reduces the visual impact and monetary value of the content.

There were several technical flaws that degraded curved-screen exhibition in the practice of the prior art. They were keystone distortion, droop effect (due to off-axis projection from the center of the screen), elongation or spreading of images at the extreme sides of the screen. Also, cross-reflection image washout on opposite sides of the screen ("cross-talk") affected image contrast and uniformity. These deficiencies were addressed somewhat in the prior art, but they were never eliminated completely. For example, O'Brien 746 (Todd-AO) failed to eliminate the keystone and droop distortions that were considered inherent artifacts of projecting a motion picture onto a screen off-axis from the horizontal line at the vertical center of the screen. These distortions were an inherent drawback of the geometry of the auditorium under the prior art, but the present invention includes a correction means for eliminating them.

There were two approaches employed during this period to mitigate the undesirable side-effects of the curved screen. The three-strip Cinerama screen was made up of three-quarter-inch-wide vertical strips that were angled toward the audience in a way that did not allow the projection brightness to affect the wings at the sides of the curved screen. The louvers, comprised of thousands of strips, were often noticeable in bright scenes. This mitigated the washout effect but created an undesirable impression of "separations" or streaks on such bright scenes. With Todd-AO, the screen sub-base material was embossed, creating small mirror-like lenses, or facets, which directed the light towards the projector; and not toward the sides of the curved screen. That system was effective, but very costly.

Recently, IMAX introduced a downsized digital version of the original IMAX 70 mm, 15-perforation "big screen" film format with an aspect ratio of 1.43:1. The Digital IMAX version projects an image with an aspect ratio of 1.9:1 from floor to ceiling and from wall to wall, but it does not utilize the science of human vision. This digital version of IMAX attempts to produce an immersive "big picture" experience, but only succeeds to a limited degree, due to the lack of peripheral impact. In contrast, Cinerama was based on knowledge of how human vision functions. It is an object of this invention to produce the sort of immersive wide-screen experience that Cinerama delivered, but at a reasonable cost and by utilizing the geometry of an existing theater, rather than altering it, especially by reducing seating capacity.

Read, Bonnick and Jacques, U.S. Pat. Nos. 7,106,411 and 8,421,991 (assigned to IMAX Corp.), point out the drawbacks as well as the advantages of converting multiplex theater auditoriums to the Digital IMAX system. Read and his colleagues taught theater installations that replaced the original screen in a theater (limited to the width of the auditorium) with a larger, slightly-curved screen, located significantly closer to the audience than was customary in exhibition practice. They also taught new projection and sound systems, along with a system for revealing the location of emergency exits, but not until an actual emergency occurred. An important drawback of theaters converted according to their method was "reducing the number of patron seats." Read et als. asserted that the higher admission price that exhibitors could charge would make up for the loss of seats; an assertion that went beyond the technical merits of the claimed system and ventured into a prediction about the long-run price elasticity of demand for seats. In contrast, the invention described here delivers an immersive panoramic experience without significantly reducing seating capacity. Accordingly, an exhibitor who installs the present invention would not lose the revenue generated by the seats that Digital IMAX (Read, et als.) sacrifices in its conversion method.

In addition, the Digital IMAX format does not allow the entire original wide-screen image to be presented without either cropping or delivering a sub-optimal letterbox presentation, which does not deliver the desired wide-screen effect, because the image would be too wide when employing the Digital IMAX aspect ratio of 1.9:1. While Digital IMAX does not deliver the immersive effect that Cinerama did, the invention described here succeeds in replicating that immersive effect, while remaining compatible with today's wide-screen formats, and without compromising the benefit of the motion picture's original aspect ratio within the confines of a conventional motion-picture auditorium.

While the single-projector Todd-AO curved-screen system was under development, it was found that the image would droop on a downward radius, affecting horizontal lines on both sides of the screen. Keystone distortion was also a significant problem, where the bottom of the projected frame appears to curve upward, on both sides of the screen. These were significant defects that needed to be addressed, as the curved screen was a major component of the 70 mm Todd-AO process (see O'Brien 746, as previously noted). This was especially problematic as projection rooms were commonly located high above the audiences in cinema auditoriums, where these distortions were most severe.

In most cases, however, this required manufacturing custom 70 mm prints for each theater that was showing a Todd-AO film, because theater projection rooms were not always located in places that would target the screen at the exact same downward angle. This optical correction method was never placed into commercial practice, due to its complexity. Keystone distortion, which created strange artifacts, such as horizons that appeared to curl up rather than down, was common on these curved screens. To correct this defect, the screen was sometimes masked, or the projector aperture plates were cut ("bow tie" profile). With either method, some of the image area, with its associated content, was lost when projected onto the curved screen.

It is an object of this invention to re-introduce an immersive wide-screen motion-picture experience, incorporating high-frame-rate methods and using a curved screen. It is a further object of this invention to deliver such an experience to audiences, for any aspect ratio of images comprising the motion pictures shown, without cropping in either the horizontal or vertical dimension. It is a still-further object of this invention to maintain compatibility with the geometry of most motion picture auditoriums, including multiplex-style theaters. This feature mitigates the potential cost and effort required to install the system used in the invention, compared to the wide-screen exhibition systems of the past.

It is an object of this invention to eliminate these distortions without the requirement for custom manufacture of motion picture prints for exhibition in a single auditorium; an artifact of the photochemical film-exhibition process. Instead, these distortions are corrected for the theater where the motion picture is shown, by a means which is a component of this invention. The invention is programmed to accomplish this for any aspect ratio and for the geometry of the format as projected, and that correction can change from one aspect ratio to another. In addition, these corrections are customized to the radius of the screen that can fit into each auditorium. Because of the correction means, there is also no need to reconstruct the architecture of an existing theater. The curved screen that forms a part of the invention can be installed in an existing auditorium, and artifacts such as keystone and droop distortion are eliminated. So is the apparent curving of vertical and horizontal lines toward the edges of the screen; an artifact that plagued many prior-art exhibition systems that used curved screens and continues to exist in digital-cinema auditoriums today, when motion pictures are displayed on slightly-curved or flat screens. Linearity is compromised at those locations, as well.

These distortions are phenomena well-known to persons familiar with the exhibition side of the cinematic art. Accordingly, it is not necessary to present a detailed explanation of them here. For a mathematical treatment of the amounts of keystone distortion, anamorphic stretch and geometric distortion caused at various projection angles in theaters with different geometric configurations, see Ronald A. Petrozzo and Stuart W. Singer: *Cinema Projection Distortion*, published by the Society of Motion Picture and Television Engineers (SMPTE), and originally presented at the *SMPTE Technical Conference and Exhibition Displays for the Theater and Home Session*, Nov. 20, 1999. It can be found at http://ieeexplore.ieee.org/xpl/mostRecentIssue.jsp?punumber=7266011. In that paper, the calculation of the amounts of keystone distortion and vertical anamorphic stretch (measured in length) are calculated on Pages 7 to 9, using FIG. 3 (at 5) and FIG. 4 (at 7) as a basis for those calculations.

It is another object of this invention to eliminate washout (also called "cross-talk"), which is another significant disadvantage of prior-art curved-screen exhibition. Some of the light emanating from the projector hits the sides of the screen and reflects toward the opposite side of the screen. This causes undesirable elevated brightness on the wings of the screen, which then reduces contrast. It is a further object of this invention to eliminate such reflection, and the invention uses a zero-gain matte screen for that purpose in the preferred embodiment. In the practice of the invention, a high-lumens LASER projector is used. This combination provides adequate light to deliver the desired presentation to the audience.

Contemporary theatrical motion picture screen dimensions have recently taken on the perceived importance of size, from from both the exhibitor's and an audience point of view. Today, they are mostly floor-to-ceiling and wall-to-wall, versus the wide screens of the last decade that specifically emphasized width. One format had an aspect ratio of up to 2.76:1 (MGM-65) and another had an aspect ratio of 2.66:1, as projected (Ultra Panavision-70). The methods used in the prior art include constant height with the width varying as aspect ratio does, or constant width, in which the height varies. With the advent of the multiplex, auditoriums became smaller and so did screen sizes. Then, with the introduction of stadium seating, with its exaggerated balcony incline, image-dominance of the screen became diminished, as audiences were seated further away from the screen. IMAX Corporation entered the multiplex business, expanding from its historical "special venue" business model that incorporated massive 1.4:1 aspect ratio, wall-to-wall, floor-to-ceiling screens; some over 100 feet (30.5 meters) in width.

Recently, IMAX introduced for commercial cinema a digital wall-to-wall screen format that would fit into a typical multiplex auditorium, but using aspect ratios as narrow as 1.77:1 and 1.9:1 with an extremely large image, and using a screen situated very close to the stadium seating (see Read 411 and 991). These installations required major alternations to the auditorium, including the removal of the original screen and a significant number of seats in the front of the auditorium. Another downside of this type of presentation is that most "tent pole" Hollywood feature films are shot with an aspect ratio of 2.40:1; much wider than can be displayed on the theatrical Digital IMAX screen without cropping or reducing size. To resolve this compatibility issue, IMAX either reduces the size of the wide image by letterboxing the picture on the screen or cropping the sides of the image, so that more of the picture fills the screen; most importantly, the height. Today, most major multiplex exhibitors either have a Digital IMAX auditorium, or they have their own brand that emulates most of the Digital IMAX screen features. The purpose of this invention is to facilitate a wide-screen presentation with an aspect ratio of 2.40:1 or wider in today's multiplex theaters, but without cropping or reducing image size and, most importantly, utilizing a floor-to-ceiling and wall-to-wall screen to deliver the benefits of those aspect ratios. Other aspect ratios, which are not as wide, can also be accommodated in the practice of the invention.

It is noteworthy that all these prior-art systems required extensive modification of the auditoriums in which they were installed, unless a venue happened to coincide with the preferred geometry for that particular system. These include the previously-cited Digital IMAX and Todd-AO patents. The Cinerama system was even more idiosyncratic than those systems, and less compatible with conventional theatrical motion picture exhibition. All of these systems were suitable only for a few existing theaters, so most venues were custom-built to house them. That difficulty precluded the prospect of wide distribution of motion pictures in their original formats and aspect ratios. It is, therefore, another object of this invention to deliver an immersive wide-screen experience to audiences in a conventional motion picture auditorium, where the exhibition system can be installed relatively easily and at a reasonable cost.

Even with new construction of motion picture theaters, the proponents of the new and immersive systems of the past gave specific advice about how to build those installations. Vetter's D-150 system, U.S. Pat. No. 3,475,086, came with these suggestions for theater architecture: "When planning the geometry of projection and locating the projection booth, several concepts should be applied for best results. The notion that projection axes should be "normal" (or zero degrees to the screen) is false in view of today's existing projection processes. Projection booths should be located as near as possible to the mean viewing sightlines of the audience" (emphasis in original). While the D-150 system allowed for curved screens that covered 120 degrees of arc, the use of wider screens was not contemplated for that invention. D-150 also allowed for changes in aspect ratio, but it also required that a new auditorium be constructed or an existing one redesigned and rebuilt. The present invention recognizes that not all theaters were built according to Vetter's advice, so it includes a means for correcting any image distortion that might result from the location of the projection booth, off-axis to the horizontal line at the vertical center of the screen. This means can be programmed into the chip used for digital projection in the practice of the invention and is custom-formatted for each individual theater in which the system described is installed. It should be noted that it is far easier and less expensive to program a projection chip than to change the architectural design of a motion picture theater.

A further advantage of this invention is that it accommodates several aspect ratios, whether wide-screen, or the traditional Edison aspect ratio of 1.33:1 or the Academy aspect ratio of 1.37:1. This is accomplished by utilizing the appropriate portion of the width of the screen, from 90° of arc, up to 146° of arc; the width of the image in the Cinerama format, or more. In addition, if a motion picture is displayed in a format that does not fill the entire height of the screen, keystone distortion is still eliminated, by using a different correction for the smaller image. There is still enhanced exhibition of these smaller images through the use of masking systems, as taught by prior inventions: Weisgerber, U.S. Pat. No. 5,121,977; and Vetter 086.

There are new image-delivery technologies, such as the virtual-reality technology developed by Oculus-Rift, which requires the user to wear a headset that completely covers the eyes and the area of the face around them, and contains a personal 3D viewing surface. The images used in the presentation are displayed on this surface and delivered to the viewer as an individual. However, a viewer can utilize such an image-delivery system at home or in another location, and in a solitary manner. The present invention preserves the communal nature of the movie-going experience, while delivering an immersive wide-screen picture-dominance experience that is not available in the auditoriums of multiplex-style motion-picture theaters through any practice of the prior art. While the present invention does not deliver a "virtual reality" experience as the Oculus-Rift headset does, it is compatible with contemporary wide-screen immersive motion picture presentation and is adaptable to such features as three-dimensional (3D) presentation and high frame rates, such as forty-eight frames-per-second. The invention also incorporates an elevated level of screen brightness. The present invention provides a significant improvement over the quality of presentation currently offered in multiplex-style auditoriums. Therefore, it renders movie-going viable in a way that no prior art can match.

In short, the invention allows display of motion pictures using different formats with different aspect ratios, with an apparently-seamless transition between them. It is, therefore, a further object of the invention to maximize the utility of existing motion picture theaters, so they can be used to display motion pictures of varying aspect ratios and formats, with a highly-versatile exhibition method and system that can be installed easily.

As part of the description of the invention, it is important to consider its scope, function and purpose. It is a method and a system for exhibiting motion pictures to theatrical audiences. That fact distinguishes it from other inventions that improve images using mathematical operations, show 3D images within a small space, or use a screen that is not a curved screen of the type currently used for theatrical exhibition. There are examples of each type of invention mentioned here. Bassi and Vakili, App. No. US-2008/0062164 A1, is drawn to a "System and Method for Automatic Calibration and Correction of Display Geometry and Color" with mathematical operations which occur inside a computer chip, and which has nothing to do with actual theatrical motion-picture display to audiences. Cope and Sillars, Pub. No. US-2009/0021162, teaches a flexible emissive surface that can be bent to conform to the structure of the auditorium in which it is installed. It functions as a direct source of light, while the present invention uses a conventional projection screen, as has been customary in theatrical motion picture exhibition for more than a century. The Cope invention is essentially a giant, flexible television screen, which is totally unlike the conventional projection screen onto which motion pictures are projected and which is an essential element of the present invention, and which the specification of the Cope invention disparages. It is unproven whether light-emitting theatrical displays will have the characteristics that appeal to audiences viewing feature-length motion pictures for up to three hours, but conventional projection screens have stood the test of time. Joseph and Reichow, App. No. US-2012/0098941, disclose the use of an obliquely-aligned glass plate to give a 3D impression with a 2D image. While that invention may work in a small enclosed space (disclosed in its specification) or in a free-air display, it cannot produce the desired impression in a space as large as a motion-picture theater. There are other inventions that touch and concern improving images or displaying them in ways that enhance the impression of those images that the viewers receive. Still, the present invention applies onto to theatrical exhibition of cinematic motion pictures on a curved screen in theaters with a certain configuration. Other inventions are irrelevant.

It must be emphasized that the present invention includes as an essential limitation that it pertains only to projecting images onto a screen in a motion picture theater. While it employs a high brightness level in connection with such projection, it also uses a matte screen in the preferred embodiment. A highly-reflective screen is not suitable for use as part of it, as shall be described. Under no circumstances does the present invention use the sort of active device which uses LEDs or other devices that emit light toward the audience.

The paramount object of the present invention is to maintain the native aspect ratio of wide-screen motion picture formats and the benefits that such formats deliver to audiences, without sacrificing image content or quality. In theaters where the width of the room is limited, that was not possible in the practice of the prior art. In displaying images which require the entire height of the auditorium from floor to ceiling, there is insufficient width to deliver the aspect ratio associated with the wide-screen format in use. So prior-art systems sacrificed width, often by eliminating the content at the sides of the image. By using a deeply-curved screen, the present invention provides for display of the entire image in its native aspect ratio, whether or not the theater in which such motion pictures are exhibited is sufficiently wide to accommodate that aspect ratio; generally 2.40:1 or wider. Because the entire image is displayed to the audience, they can enjoy an image that prior art systems did not permit them to see in that venue. As a substantial additional benefit, the image appears wider than the confines of the room; a feature that was also not available in the practice of the prior art.

The present invention teaches a method and system for delivering a panoramic, immersive motion-picture experience for audiences in theaters. It is a novel feature of the invention that, due to the curved screen, method for correcting the image to the venue where it is displayed and other features, the image that viewers in the viewers observe appears to exceed the physical width of the room, in the preferred embodiment of the invention. In other words, the image can appear wider than the room in which it is displayed. This is the preferred embodiment of the invention, which uses its features to full advantage. As stated previously, this is an additional benefit that stems from the fulfillment of the primary object of the present invention, which is to deliver the benefits of the native aspect ratios of wide-screen motion picture formats, including in venues which could not previously accommodate them.

It should also be noted that it is not necessary to use the system to its greatest advantage to secure some benefit for theatrical audiences. If a theater owner were to use the structures of the present invention on a smaller screen that is not large enough or sufficiently deeply-curved to deliver as large or wide an image as the invention is capable of delivering, the viewers in that theater would still see improvements in the images that they observe on the screen, compared to the current state of the art of motion-picture exhibition. While this sort of use is not the preferred embodiment of the invention, it would still deliver some of the advantage of the invention, and should still be considered as lying within the scope of the invention.

BRIEF DESCRIPTION OF THE INVENTION

In the auditoriums that comprise most motion picture theaters, the size and aspect ratio of the image are the major factors in determining the level of wide-screen immersive character of the audience's cinema experience. In a conventional motion picture theater, a flat screen placed near the front wall of the auditorium covers a finite amount of space, measured vertically and horizontally. If a projected motion picture is measured by height and aspect ratio, one of those dimensions is inherently limited, due to the restrictive dimensions of the wall itself. If the images that comprise the motion picture are displayed using the entire height of the screen and the image is too wide to fit within the width of the screen, it is necessary to sacrifice some image content. This approach is known as "common height" or "common width" design and is used for configuring and installing the screen system. Either the images are cropped and the content at the sides is lost, or the entire image is displayed in letterbox format, and there is empty space above and below it.

In the practice of the invention described here, the traditional flat screen is replaced with a curved screen, which not only covers the height of the auditorium as a flat screen would, but also curves around the sides of the auditorium toward the audience. The invention employs a curved screen to retain the entire width of the wide image and, at the same time, deliver the immersive effect to the audience that is an object of this invention. In the practice of this invention, it is the height of the screen that determines image size, and not the limitation of the width of the front wall of the room. In addition, there is no need for expensive changes to geometry or architecture of the auditorium as part of the installation of the system. There is also no need to eliminate any seats, as is required when a multiplex auditorium is retrofitted to use the Digital IMAX system.

Many of the theaters that exhibited motion pictures made in non-standard formats, such as IMAX 15-perforation film, were usually installed in special venues rather than conventional multiplex motion-picture theaters. In the practice of the invention described here, such expensive construction is not necessary, so conventional motion picture theaters can now host presentations that deliver the big-screen experience and immersive wide-screen effect that was not available to audiences in such theaters before.

This invention uses a linear or non-linear wide curved screen, as well as a single high-illumination digital cinema projector incorporating proprietary image-mapping software that compliments the dimensions of the screen, screen radius and projector placement. The software can be pre-programmed to alter pixel mapping, depending on the aspect ratio of the images that are projected onto the screen. When the system is installed in a theater, it can accommodate several formats with different aspect ratios, which are programmed for that particular auditorium during installation. For each of these aspect ratios, the system is programmed to include a correction that eliminates image distortion resulting from the size and width of the image, screen placement in relationship to the projector, and the shape of the screen itself. As a result, the screen image has none of the geometric distortion that is common with curved screens. It is the principle of this invention to retain the original wide-screen aspect ratio that the filmmaker created, but without cropping or reducing image size to accommodate the lack of compatibility of the screen's dimensions in the auditoriums of today's theaters; often branded as "large format" screens, in common width configurations. Further, this invention does not alter the quality of the curved-screen image as in the past, with artifacts such as keystoning, droop distortion, elliptical corner distortion, image washout, due to use of gain-producing screen surfaces, to the detriment of contrast and brightness of the projected image. It is a feature of this invention to utilize the entire width of a motion-picture image with a wide aspect ratio, even when the front wall of the auditorium is too narrow to project that entire image onto a floor-to-ceiling flat screen.

In this way, conventional motion-picture auditoriums, including including today's multiplex designs, can be retrofitted with the system described in the invention, so they can deliver an immersive wide-screen experience that was never available before; unlike theaters that were built for the specific purpose of showing such wide-screen motion pictures in the past. It should also be noted that the invention relates to exhibition of the pictures themselves, and not to sound systems. It does not preclude the use of any sound system currently known to be in use or under development, including multi-channel systems.

The components of the preferred embodiments of the invention are as follows;

1. A zero-gain matte sound-perforated cinema screen with a surface that covers floor-to-ceiling and wall-to-wall, capable of accommodating a range of aspect ratios from 1.33:1, to 2.76:1; said screen also being curved in such a fashion that a wide-screen presentation can be exhibited with a floor-to-ceiling, wall-to-wall image that is wider than the auditorium's horizontal dimension, due to the curvature of the screen;

2. A single-LASER or multiple-LASER high-brightness digital cinema projector, with adequate light output to provide 14 to 22 foot-lamberts of reflective light, or greater, for both two-dimensional (2D) and three-dimensional (3D) presentation;

3. A digital image mapping processor that is designed to create a screen image that is free of artifacts and distortion onto a curved cinema screen, and which retains all of the image information that is present on the digital cinema file being displayed;

4. A method of changing image-correction to suit the geometry of the screen for different image sizes, and from one aspect ratio to another, to accommodate the many different image height-to-width dimensions of various formats during a cinema program, such as screen advertising, trailers and features; and 5. A method that does not prohibit the use of high frame rates, or limit screen speaker placement, such as three or five screen channels, including multiple subwoofers and surround.

The invention can be installed in any motion picture theater with minimal disruption to the layout of the auditorium in which it is used. The geometry correction is specifically calculated to eliminate droop and keystone distortions for the specific auditorium in which the system is installed, and to eliminate the effect that vertical lines appear further apart from each other at the outer edges of a deeply-curved screen, compared to the area near the center of the screen, or that circles appear elliptical at the edges of the screen. The projector uses a Digital Light Processor (DLP) chip method, as shall be described further. Thus, it is easy to display a motion picture with any aspect ratio on a curved screen without objectionable distortion, and to change from one aspect ratio to another during a program, using the invention.

The correction that eliminates the above-mentioned artifacts is accomplished through the use of mapping software, which places each pixel of every image in a position to be projected to the proper point on the screen, in order to deliver a distortion-free picture to viewers in the theater. The resulting image covers the entire height of the auditorium, from floor to ceiling, and extends the width of the image by incorporating a curved screen, which is a vital component of the invention. The image extends as far laterally from the center of the screen as required for the aspect ratio being projected. The screen used in the practice of the invention must have sufficient curvature to retain the appropriate aspect ratio, using the entire height of the auditorium and without cropping image content. The mapping software eliminates the sorts of image distortion that would otherwise be caused by the screen configuration, projector location and geometry of the auditorium. This large, immersive picture, combined with the wrap-around presence of the curved screen, delivers an undistorted effect of picture-dominance to the audience; an effect which was not available under the prior art.

This is important, especially with the revival of ultra-wide-screen formats, which feature extremely wide aspect ratios. For example, there has recently been even new emphasis on the use of wide aspect ratios for "event films" such as the Ultra Panavision-70 production of The Hateful Eight, which had a photographic aspect ratio of 2.76:1, as well as "Scope" photography at 2.40:1, shot with 2× anamorphic compression or spherical photography cropped for a 2.40:1 aspect ratio. In addition, the Walt Disney Company recently reported that Rogue One: A Star Wars Story will be shot in Ultra Panavision-70 at a 2.76:1 aspect ratio for certain scenes containing special effects.

Today's projection technology is no longer a film-based method, but a digital cinema technology created by Texas Instruments Company, called Digital Light Projection, or DLP. The "digital cinema light engine" is basically three DLP chips, one for each of the primary colors: red, green and blue, in 4K digital format. The aspect ratio of the area in which the mirrors are placed on the DLP chip, in the case of a 4K-capable projector most common in today's cinema, is 1.9:1. The light employed for the digital cinema projector is either xenon, or more recently, LASER illumination. Each chip is made up of millions of articulating mirrors which, when interfaced with the DLP light engine cluster, creates a "film like" image on a movie screen. In the case of 4K displays, each chip has 4096 by 2160 micro mirrors. Depending on the aspect ratio of the motion picture shown, not all of the mirrors are active at all times. Depending on how the images are formatted, only certain areas of the chip are active. For example, with a 1.85:1 aspect ratio, there would be non-active mirrors on the left and right sides, sometimes called "pillar boxed." With a 1.40:1 aspect ratio production, a 25% squeeze is used with all chip mirrors active, and an un-squeezing anamorphic lens is used in projection to restore the original image width. In addition, it is also possible to re-scale the 25% squeeze of the file in the projector's electronics and letterbox an un-squeezed image, but some DLP resolution and screen brightness is often compromised with this method.

The invention delivers the level of image dominance associated with immersive formats, but there is no need to crop images, as Digital IMAX and similar competing systems often do. In addition, it accommodates aspect ratios sufficiently wide to display the entire wide-screen image, without having to resort to the letterbox format that limits image height when the full width of the image is displayed. In effect, this invention keeps the entire image on the curved screen, which maximizes the impression on the viewers.

DETAILED DESCRIPTION OF THE INVENTION

This invention combines several components into a system for delivering an immersive wide-screen experience to the audience in a motion-picture theater auditorium. Therefore, this invention is not only a system, but also a method for delivering such an experience by using the system described. It is not merely a combination of known elements that produces an enhanced result, however. There are novel uses of some system components, which assist in delivering the desired audience experience. These components were listed earlier in this document. The following description elaborates on these components and how they interact to produce the desired result.

The drawings do not depict the architectural features of the auditorium into which the invention is installed, because these features are not relevant to the functionality of the invention if the auditorium itself can accommodate the screen and other components of the system. It is envisioned that many of the auditoriums in which the invention will be installed and used are multiplex-style theaters. The invention includes a means for correcting any image distortion that could arise because of the particular geometry or architecture of the auditorium, so any differences from one auditorium to another will not detract from the overall immersive experience which the invention is designed to deliver to audience members. In other words, the present invention allows projection of motion pictures in their native wide-screen formats in auditoriums whose geometry would not otherwise accommodate such projection onto a wall-to-wall and floor-to-ceiling screen.

Figure 1:
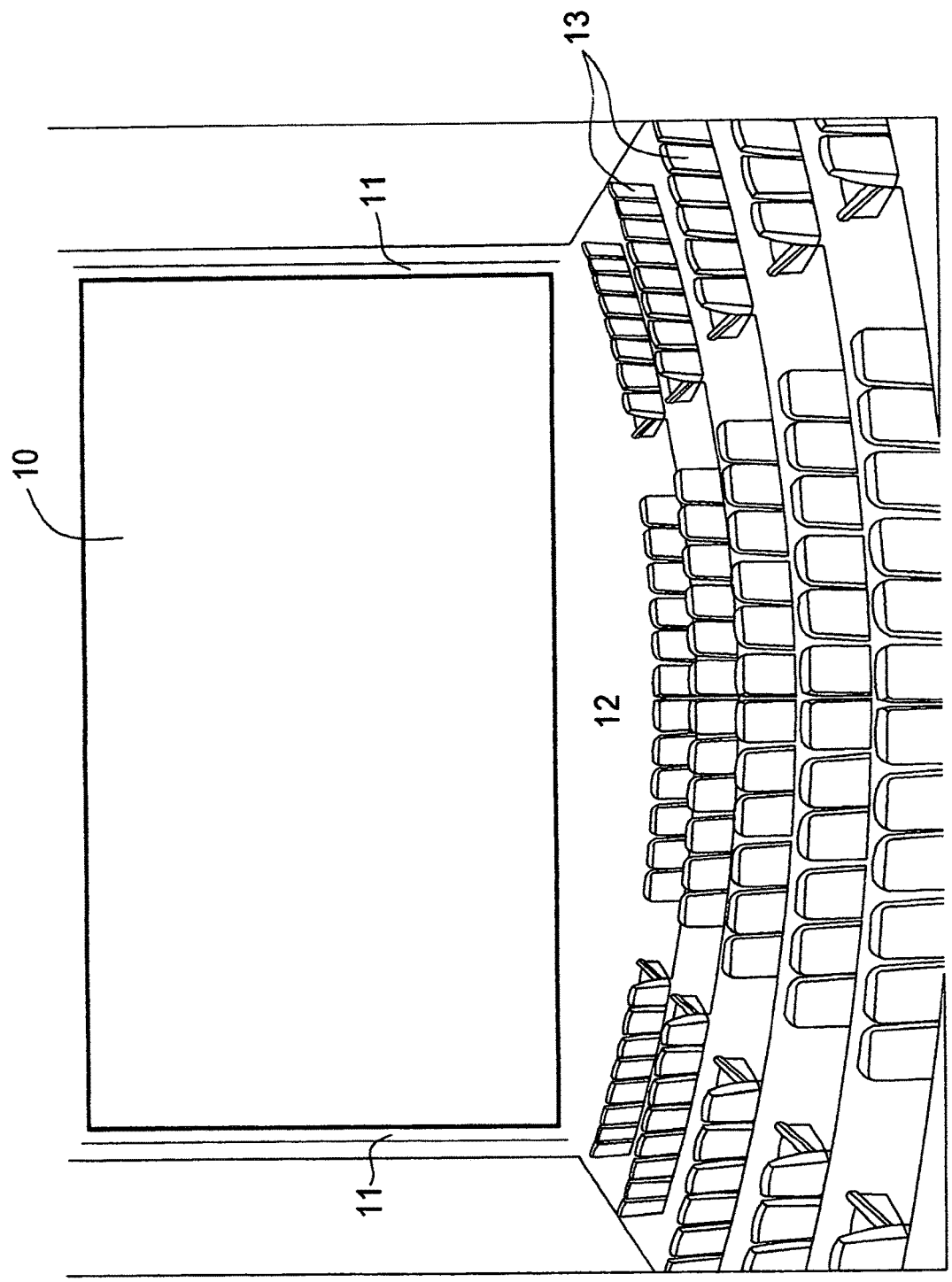
FIG. 1 shows a comparatively flat floor-to-ceiling screen installed in a motion-picture auditorium according to the prior art, similar in design to a Digital IMAX installation as taught in U.S. Pat. No. 8,421,991, as seen from the rear of the auditorium, looking toward the screen.
Figure 2:
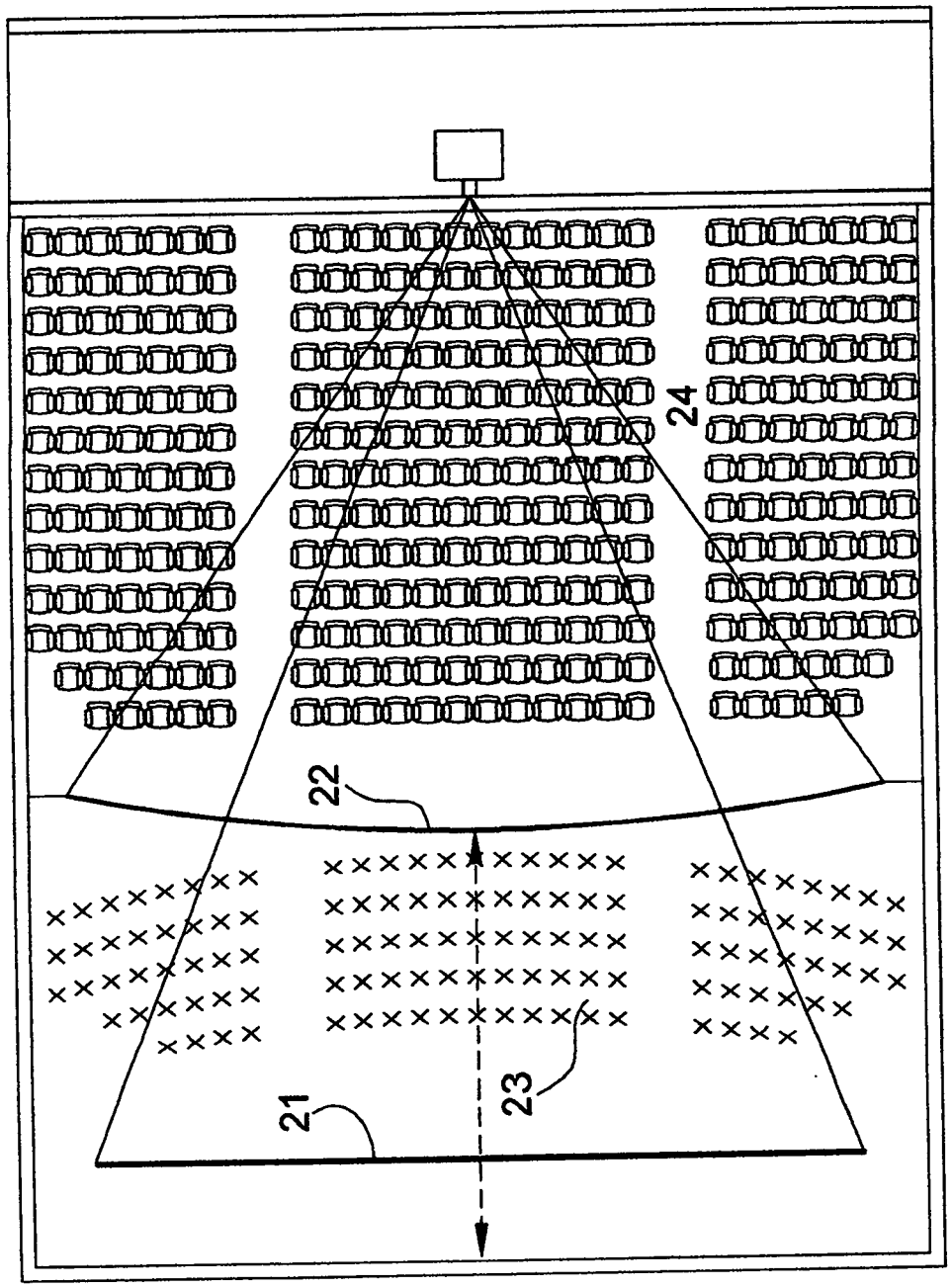
FIG. 2 shows an overhead view of a motion picture theater with a Digital IMAX or similar "common width" installation, according to the same prior art. It is similar in design to FIG. 3 of U.S. Pat. No. 8,421,991, which teaches a theater conversion requiring removal of several rows of seats at the front of the auditorium.
Figure 3:
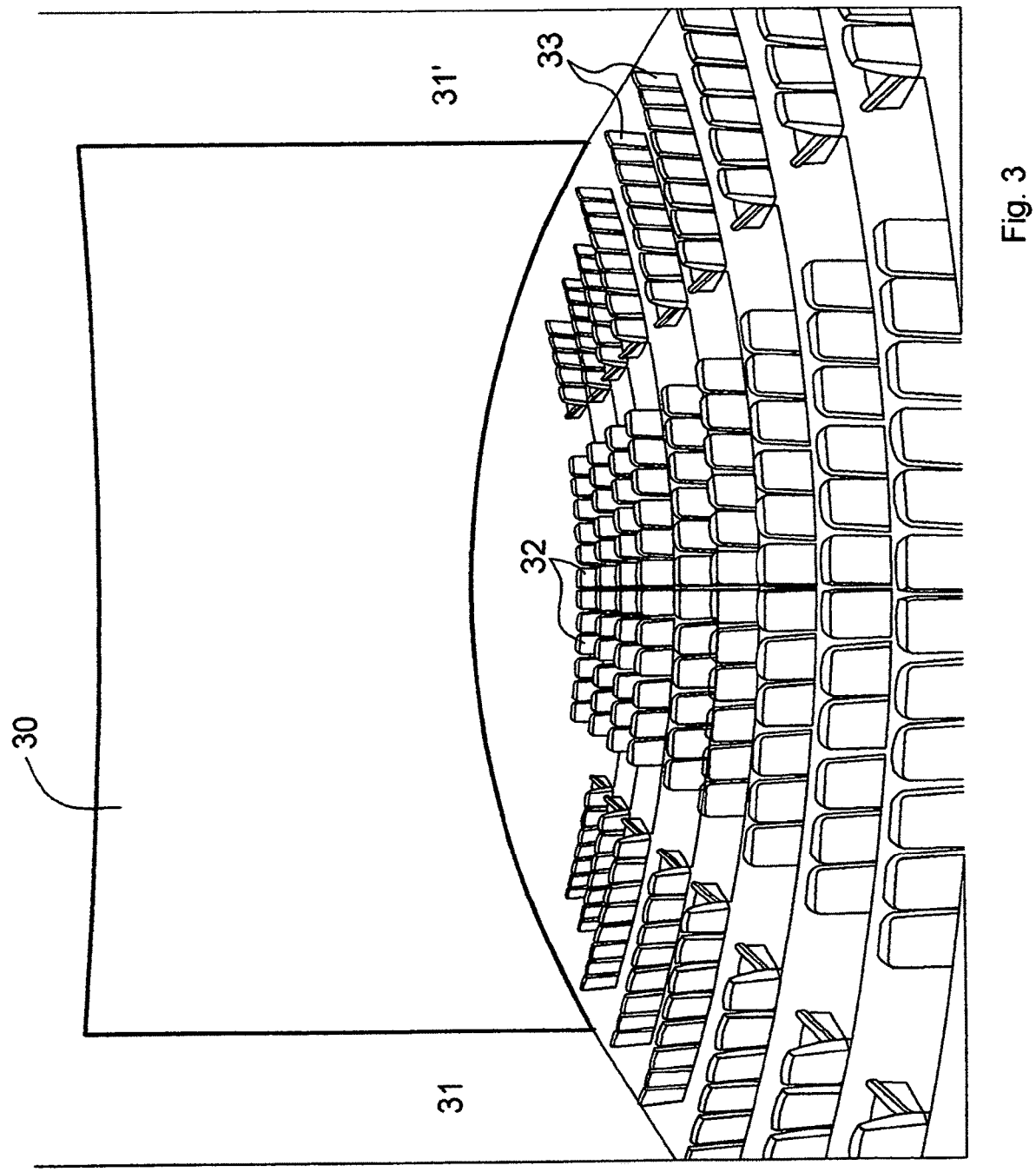
FIG. 3 shows a curved screen in an installation according to the practice of the invention described here, in a view like that shown for the prior art in FIG. 1.
Figure 4:
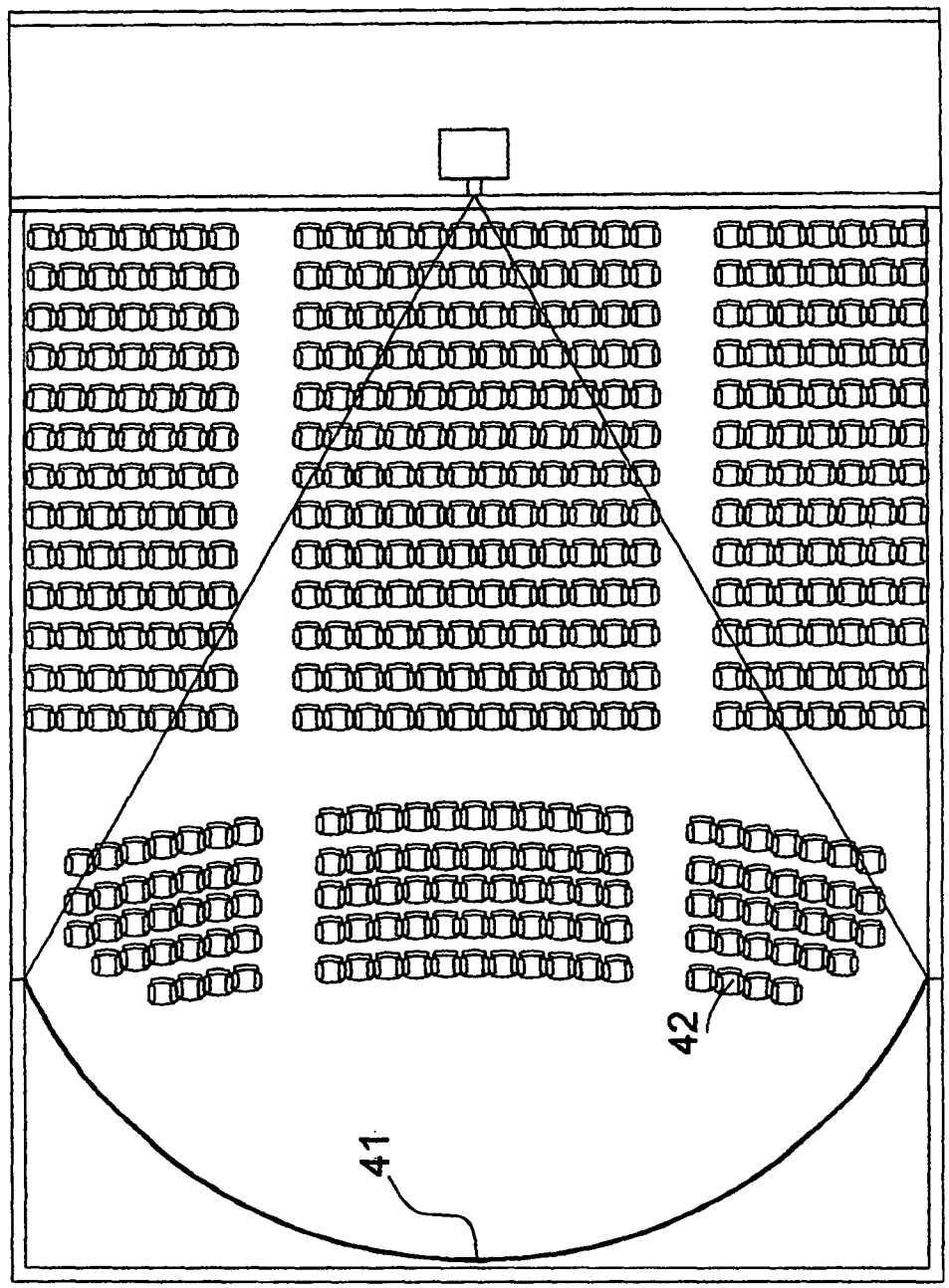
FIG. 4 shows an overhead view of a motion picture theater with the system described in the invention installed therein.

FIGS. 1 and 3 show a comparison between a comparatively flat, floor-to-ceiling motion picture screen (FIG. 1) and a floor-to-ceiling curved screen, as used in the practice of the invention (FIG. 3). It can be readily seen that the curved floor-to-ceiling and wall-to-wall screen presents a larger and more dominant picture to the viewers in the audience, as it curves toward the sides of the theater and delivers more visual content to the viewers in the auditorium. As shall be described, FIG. 2 is an overhead view of an auditorium containing the prior-art installation shown in FIG. 1, while FIG. 4 is an overhead view of an auditorium of similar size and shape, and in which the invention described here is installed.

In FIG. 1, screen 10 covers from floor-to-ceiling, with an aspect ratio of 1.77:1 (original Digital IMAX), although the prior art also calls for an aspect ratio of 1.9:1. Screen 10 extends to walls 11 and 11' which limit the width of screen 10. There is a large space 12 between screen 10 and seats 13, which are the seats available for patrons.

FIG. 2 is an overhead view of a motion picture auditorium with the Digital IMAX system installed; an example of the sort of immersive-presentation venue that has existed in the prior art. The location of the original screen 21 was at the front of the auditorium. The Digital IMAX screen 22 is located significantly closer to the audience than the original screen 21 was; near the first row of seats as configured in the original theater architecture. Area 23, marked by Xs, shows the location of seats that were originally part of the audience seating area, but were removed because screen 22 was relocated. It should be noted that FIG. 2 is like FIG. 3 in U.S. Pat. No. 8,421,991 (Read et als.). Seats 24 mark the location of the remaining seats available for members of the audience in the prior-art installation. Thus, the use of the Digital IMAX system to produce a contemporary viewing experience for the audience requires that a significant portion of available seating space be sacrificed, which was taught by Read in U.S. Pat. No. 7,106,411, assigned to IMAX Corporation. This loss of seating capacity adversely affects the amount of revenue that an exhibitor can earn for each showing of a motion picture. Seats 24 are stylized, and do not necessarily reflect the actual number of seats in a particular auditorium.

FIG. 3 shows the invention described here in an auditorium comparable in size to the one shown in FIGS. 1 and 2. As in FIG. 1, FIG. 3 shows a view from the back of the auditorium, toward the front. Screen 30 is curved and utilizes the entire height of the auditorium, from floor to ceiling. Because it is curved, screen 30 is significantly wider than screen 10, its counterpart in FIG. 1, and its curvature allows it to exhibit more content than screen 10 in a physical space of comparable width. Its surface can receive a wider image, and that image is corrected to deliver a distortion-free appearance. The edges of screen 30 meet walls 31 and 31' along lines closer to the patron seating area than in the prior-art installation shown in FIG. 1. Seating area 32 is located comparably to space 12 in FIG. 1 or space 23 in FIG. 2, which represent an area from which seats have been removed in Digital IMAX installations. Seating area 33 is comparable to seating area 13 in FIG. 1, but the seats in seating area 32 do not exist in prior-art Digital IMAX or similar installations. The invention, therefore, does not require letterbox format or cropping of images, while it also allows a theater to admit more patrons to each showing.

FIG. 4 is an overhead view, like FIG. 2, of an auditorium with this invention installed. It contains a wall-to-wall and floor-to-ceiling curved screen, which delivers the advantages of other wide-screen immersive theatrical motion-picture presentation formats. Screen 41 is located near where the original Screen 21 in FIG. 2 was located in an auditorium of comparable size, so seating area 42 includes not only the seating area shown as 24 in FIG. 2, but also the area shown as 23 in FIG. 2, which was eliminated to accommodate installation of the Digital IMAX screen and seating configuration taught by Read 411 and 991. In contrast with Digital IMAX installations, the present invention retains all or nearly all of the original seating capacity of an auditorium, while still providing the immersive experience which is its primary object. In the practice of the invention, screen 41 is placed near the front wall of the auditorium, which also maximizes patron seating capacity. Screen placement according to the invention must allow sufficient room for speaker installations normally used in such auditoriums, including subwoofers. Screen speaker placement is not a limitation on the practice of the invention.

FIGS. 2 and 4 depict an important advantage gained from the invention. While the Digital IMAX format is used as the prior art in this example, the utility of this invention also applies to all formats using similar aspect ratios that are installed and promoted by studios, as well as by multiplex theater owners themselves.

The invention uses a zero-gain, non-reflective matte screen. A reflective pearlescent or "silver screen" is not suitable for this invention because the screen is curved, which would result in image cross-talk on a reflective screen. In other words, the curvature would allow light to reflect from the sides of the screen toward its center, if a reflective screen were used. This would produce a washout effect, which is undesirable. Accordingly, a perforated zero-gain matte screen is used in the preferred embodiment of the invention.

The screen must be curved to accommodate the limited width of the auditorium in which in is installed, due to the wide aspect ratios commonly in use. A custom-built screen is installed in each theater, according to the geometry of the auditorium in which it is installed. In the preferred embodiment of the invention, the height of the screen reaches from floor to ceiling, and the phrase "floor-to-ceiling screen" is often used in this document to describe it. If an auditorium has certain architectural limitations that would preclude the use of a floor-to-ceiling screen configuration, this method can allow for a reduced screen height, if necessary, while still retaining the benefits of the invention. In other words, if the design of the auditorium includes any features that would prevent a screen from occupying the entire height from floor to ceiling, the invention could still be installed within the available height. While such a configuration would not deliver the entire immersive effect of image dominance, it would still produce a significant benefit to the viewers of the motion pictures exhibited in any commercial multiplex-style auditorium. The use of a curved screen of the maximum height that will fit into the auditorium, in conjunction with the other components of the invention, still maximizes audience impact. A gain screen can still be used if the projector light source cannot deliver the desired brightness, but at the possible expense of cross-reflection (cross-talk) of light on the curved screen, which would affect side radius contrast. The benefits of the invention would still be present if a screen with nominal gain is used, but a matte screen delivers the best effect.

According to the prior art, most wide-screen exhibition systems utilized flat screens or screens that were only slightly curved. Cinerama and Todd-AO were the notable exceptions. More recently, despite its large picture, the original film-based IMAX system used a screen that was nearly flat. Audiences viewed the action being displayed on, essentially, the entire front wall of the theater. The original IMAX system delivered a "picture dominance" effect. Its successor, Digital IMAX, sacrifices the ultra-large screen of the original film-based IMAX system that was installed in a limited number of venues, to obtain the flexibility of installation in a broader segment of commercial motion-picture theaters. Digital IMAX installations employ screens that are significantly smaller than film-based original IMAX screens, and they are flat or only slightly-curved. As a result, Digital IMAX has achieved a limited degree of picture dominance solely due to its moderate size, but the immersive experience is severely diminished, and the panoramic effect is also limited. The present invention delivers the immersive effect of a floor-to-ceiling screen, and is enhanced by the panoramic visual impact of the wide, curved screen, which is compatible with wide-screen theatrical formats with aspect ratios such as 2.40:1 or wider.

Because the invention is custom-installed in each theater, different types of curved screens can be used. A linear screen, with a constant curvature along its width, is suitable for many installations. A non-linear screen may be optimal for other installations. In that situation, the angle of the screen to the projector changes at two or more laterally-symmetrical inflection points equidistant from the vertical mid-line of the screen. The invention can also use nonstandard screen configurations, such as compound curve. The screen must be curved to provide the desired immersive effect, and the invention optimizes the image for display on whichever configuration of screen is installed in the auditorium where the invention is used.

In order to deliver an immersive presentation to theatrical audiences, the invention is compatible with the geometry of essentially any motion-picture theater auditorium. The largest component of the invention is a curved screen, which is installed within the existing room. It is not necessary to remove many seats or reconfigure the auditorium itself, to accommodate the invention. In the preferred embodiment of the invention, the entire height of the theater, from floor to ceiling, is used for screen surface. The image also extends toward the peripheral edges of the screen to the extent needed to deliver the aspect ratio of the motion picture being displayed. The invention can support different aspect ratios, as will be described. It also uses the concepts of curved screen design already known in the art. See, e.g. Marques, Guckian and Taylor: *Compound Curve Multi-Format Screen Design* (2007) at www.in70mm.com.

It is a vital feature of the invention that the width of the image along the curved screen exceeds the physical width of the auditorium in which the invention is installed. This way, the invention can deliver an image that is wider, and appears larger to the audience, than can be accommodated on a flat screen at the front of that auditorium. This image size, combined with the panoramic appearance of the image on the curved screen, produces the desired immersive audience effect. This combination gives viewers the impression that the action is happening around them, and not only in front of them. They feel like they are "in the action"; not merely viewing it from afar. This is the picture-dominance effect which the invention is designed to deliver. It is not necessary to generate novel screen designs for this invention, since it includes a means for eliminating any image distortion that might otherwise arise because of the geometry of the theater or the radius of the screen itself. This correction means will be described later in this document.

Because the screen is curved, the invention can display a wider image than the physical width of the theater could accommodate. When using a floor-to-ceiling screen to display the entire image in a wide-screen motion picture format, the screen will be wider than the front wall of a typical multiplex auditorium. Therefore, the width of the image is measured along the curve of the screen, extending outwardly at its edges, toward the audience.

Because versatility of presentation is a vital feature of the invention, the screen must be wide enough to accommodate any aspect ratio used in the motion-picture industry today, or any aspect ratio that could foreseeably be introduced or revived in the future. Currently, the widest is Ultra Panavision-70, used in the 1970s and again in 2015 for The Hateful Eight. That format uses 65 mm film stock (commonly known as the 70 mm format), photographed anamorphically compressed, and displayed with an aspect ratio of 2.66:1. This invention would also accommodate other aspect ratios that are not as wide, but in no event would it be necessary to resort to cropping either the sides of the image, or using the letterbox format that leaves unused space above and below the image. Thus, the invention can accommodate any aspect ratio, including as wide as 2.76:1, using the entire height of the auditorium, from floor to ceiling. It also uses as much screen width as needed to display the proper aspect ratio of the motion picture being exhibited. In this way, the invention avoids the sub-optimal use of space required by the letterbox format, as well as the loss of content due to cropping the images at the sides.

Figure 5:
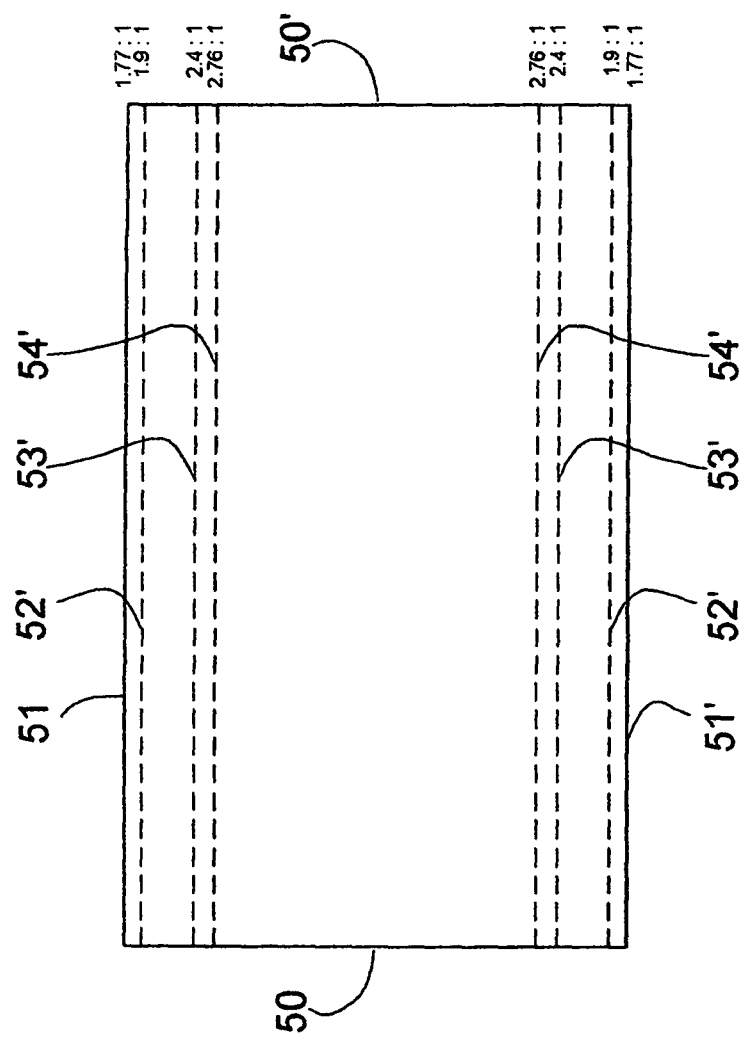
FIG. 5 shows a comparison between a conventional aspect ratio as practiced in the prior art, and wide-screen aspect ratios as used in this invention. The 1.77:1 aspect ratio of the prior art fills the entire screen, with wider aspect ratios of 1.9:1, 2.40:1 and 2.76:1 contained within it, show the common width letterbox format that would be required for exhibition according to the prior art. Although a curved screen is in integral feature of the present invention, the curvature of the screen is not depicted.
Figure 6:
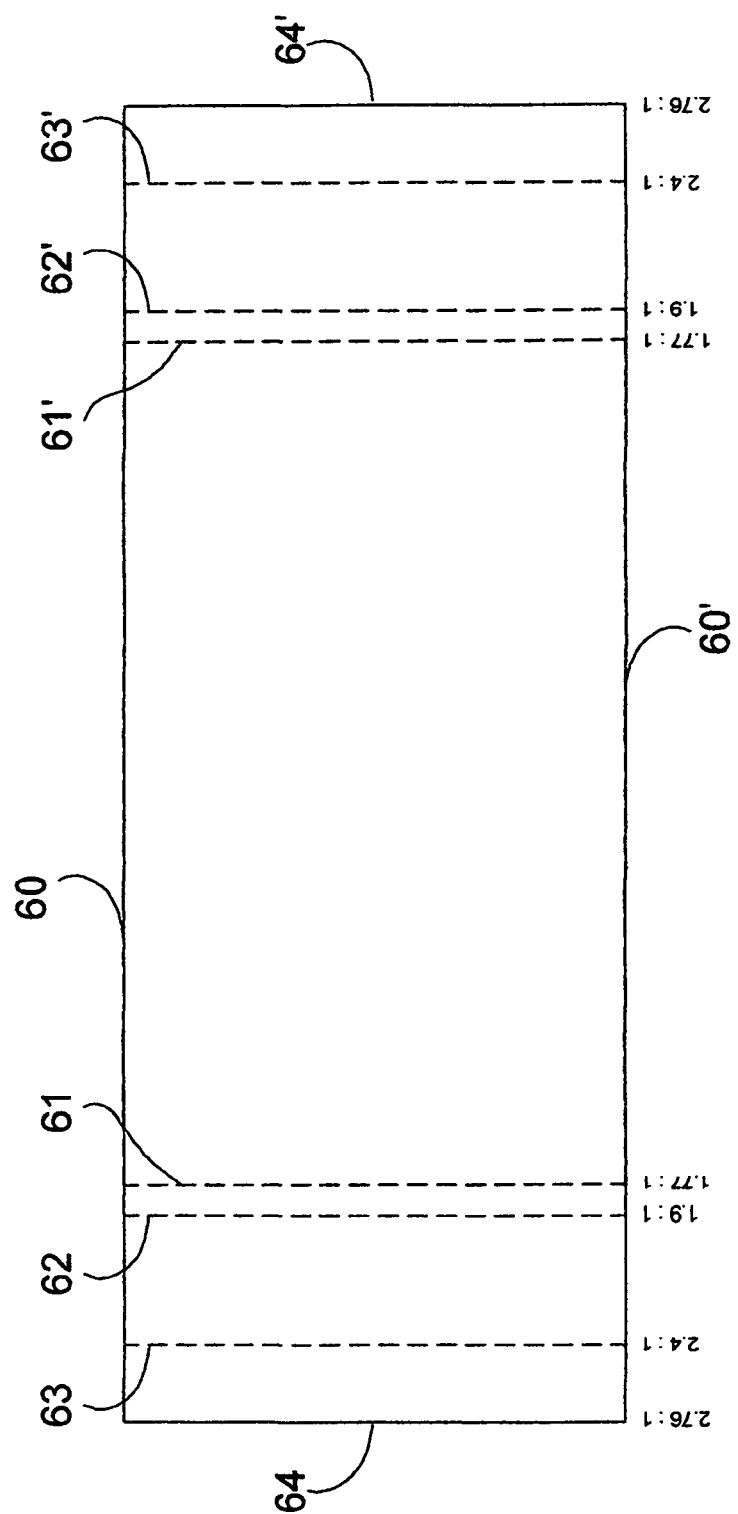
FIG. 6 shows the opposite comparison with a wide screen that can accommodate a 2.76:1 aspect ratio, with narrower aspect ratios of 2.40:1, 1.9:1 and 1.77:1 contained within it, utilizing the entire height of the screen. As in FIG. 5, the curvature of the screen is not depicted.

FIGS. 5 and 6 show two comparisons between aspect ratios that can be accommodated in the practice of the invention. Although the invention uses a curved screen, FIGS. 5 and 6 do not depict this curvature, because they concern only aspect ratios.

FIG. 5 shows a motion-picture screen formatted for the prior-art aspect ratio of 1.77:1. Vertical lines 50 and 50' indicate the sides of the screen, while horizontal lines 51 and 51' indicate the top and bottom of the screen, respectively, at that aspect ratio. Within the boundaries of the screen, horizontal lines 52 and 52' are located within the confines of the original screen and show the 1.9:1 aspect ratio of more recent Digital IMAX installations, which is also the native aspect ratio of the DLP (Digital Light Processor) 4K chip, which measures 4096 pixels wide and 2160 pixels high. Horizontal lines 53 and 53' mark the letterbox format required to display a motion picture with an aspect ratio of 2.40:1. As can be seen, there is not enough room on the screen to display the entire image, so space at the top and bottom of the screen is wasted and the image itself must be shrunk to fit within the confines of the screen. The same holds true, but even more starkly, for an image with an aspect ratio of 2.76:1. The top and bottom of the available space for images at that aspect ratio is shown by horizontal lines 54 and 54', showing that the letterbox effect is even more severe than for the 2.40:1 aspect ratio.

FIG. 6 shows the opposite effect, as obtained with the invention described here. This drawing depicts a screen as installed according to the invention and used to display motion pictures of various aspect ratios. Again, while a curved screen is a vital feature of the invention, the curvature of the screen is not shown in this illustration. Horizontal lines 60 and 60' are the top and bottom lines of the screen, corresponding to the floor-to-ceiling screen that is installed in the practice of the invention. Vertical lines 64 and 64' indicate the widest extent of the screen used in the invention, which accommodates an aspect ratio of 2.76:1 and vertical lines 63 and 63' form the edges of the screen when configured to display a motion picture with a 2.40:1 aspect ratio. Vertical lines 62 and 62' show an aspect ratio of 1.9:1; again, the aspect ratio used in more recent Digital IMAX installations and the native aspect ratio of the 4K DLP chip. Vertical lines 61 and 61' show the width of the 1.77:1 aspect ratio, as practiced in the prior art.

Therefore, FIGS. 5 and 6 indicate that, in the prior art, a wide-screen presentation format required letterboxing, with its consequent loss of available space for displaying the picture to the audience. In contrast, the present invention allows the full floor-to-ceiling height of the screen to be used for display, for any aspect ratio. That includes wide-screen formats with aspect ratios as wide as 2.76:1 which are used for their immersive character, aspect ratios consistent with prior-art formats 1.77:1, and historic aspect ratios, including the historic Edison aspect ratio of 1.33:1 and the traditional Academy aspect ratio of 1.37:1. As shall be shown, each of these aspect ratios can be accommodated in a manner that corrects the image for any distortions such as keystoning and droop distortion, which can result from the geometry of the auditorium or the shape of the screen.

The comparison between a wide aspect ratio and a narrower one can be seen from the drawings. As an example, consider the 1.77:1 aspect ratio used for HDTV and the original version of Digital IMAX. A floor-to-ceiling screen would require a width 1.77 times its height, to accommodate such an image. For example, a screen 25 feet (7.6 meters) tall would require 44 feet, three inches (13.5 meters) of width. Such a screen could not accommodate an image with an aspect ratio of 2.40:1 or wider, because it would not be sufficiently wide, compared to the height. The entire height of the screen would be used, and the sides would be cropped, sacrificing those portions of the content, or else not all of the height of the screen would be used, in order to retain the entire width of the picture. That result would be a letterbox-format presentation, which wastes the space at the top and bottom of the screen, thereby sacrificing the advantage gained when a picture is displayed on a floor-to-ceiling screen. Some Digital IMAX installations utilize aspect ratios that are wider, such as 1.9:1. While the letterbox effect would not be as pronounced in those installations as in those built for a 1.77:1 aspect ratio, such an installation still cannot deliver the benefits of a wide-screen presentation, as described for the present invention.

The invention requires a high level of screen brightness, preferably 14 to 22 foot-lamberts. The display of bright images is a component of the immersive experience which the invention is designed to deliver. With a zero-gain matte screen, rather than a reflective screen, the projector must throw a large quantity of light toward the screen. In the preferred embodiment of the invention, this is accomplished using a LASER projector, although a xenon-lamp projector would be suitable for small auditoriums. Projectors made by Christie or Barco, and other similar units commonly used in motion picture theaters are suitable for this invention.

In the preferred embodiment, a zero-gain matte screen is used in conjunction with a digital projector that can supply fourteen foot-lamberts of screen brightness or more, up to twenty-two. This combination of high screen brightness and a zero-gain screen eliminates reflection of light (cross-talk) between the two sides and toward the center of the curved screen, especially on a deeply-curved screen. In situations where the geometry of the theater into which the invention is installed cannot provide these ideal conditions, it is possible to use a nominally-reflective screen, such as one with a gain factor of 1.3, especially when the projector used in such an installation cannot produce the optimal amount of brightness: fourteen foot-lamberts or more. In those situations, a nominally-reflective screen and a less-powerful light source can be used. This combination would not deliver the full benefit associated with the preferred embodiment of the invention, but it would produce a superior result than is available in the practice of the prior art.

The brightness level of fourteen to twenty-two foot-lamberts or more is an important feature of the present invention, especially since a matte screen is used in the preferred embodiment. Historically, with film presentation, fourteen foot-lamberts was the maximum attainable level of screen brightness, because a brighter image would display objectionable flicker at the conventional frame rate of twenty-four frames-per-second. The typical brightness level was eleven to twelve foot-lamberts, while some exhibitors displayed pictures with only eight or nine foot-lamberts, to save on costs for projector light bulbs and electricity. The 70 mm Todd-AO system (O'Brien 746) used the higher frame rate of thirty frames-per-second, so flicker was reduced, and pictures were displayed at sixteen foot-lamberts or more. With digital projection, there is no shutter, so there is essentially no blanking time and light hits the screen almost continuously. Because of that, it is possible to attain higher brightness levels, and digital projection systems like Digital IMAX and Dolby Vision employ levels of sixteen foot-lamberts or more.

The present invention calls for brightness levels of at least fourteen foot-lamberts in the preferred embodiment, with twenty-two foot-lamberts possible. This is important in the practice of the invention, since it uses a matte screen in the preferred embodiment, because a bright image displayed on a gain screen would have the objectionable artifact of light being scattered and producing cross-talk at the opposite side of the screen. With zero gain in the screen, a bright light source is needed to present an image of appropriate enhanced quality.

The foregoing discussion applies to 2D presentation, but the present invention is also useful for 3D presentation, where screen brightness is especially compromised. With current 3D presentation methods, a polarizing objective in front of the prime projector lens consumes light, as do the filtering glasses worn by the audience members in the theater. These devices absorb so much light that only two to three foot-lamberts of brightness reach the viewers in the prior art. A LASER projector, as used in the preferred embodiment of the present invention, generates enough light to provide a commercially-viable brightness level for both 2D and 3D presentation.

A screen with sufficient curvature to allow the width of motion picture images to accommodate the native aspect ratio of any wide-screen format is used in the preferred embodiment of the invention, even though the width of the theater into which it is installed could not previously exhibit motion pictures in such native formats on a floor-to-ceiling screen. However, the amount of curvature of the screen will depend on the geometry of the auditorium in which it is installed for the practice of the invention.

Figure 7:
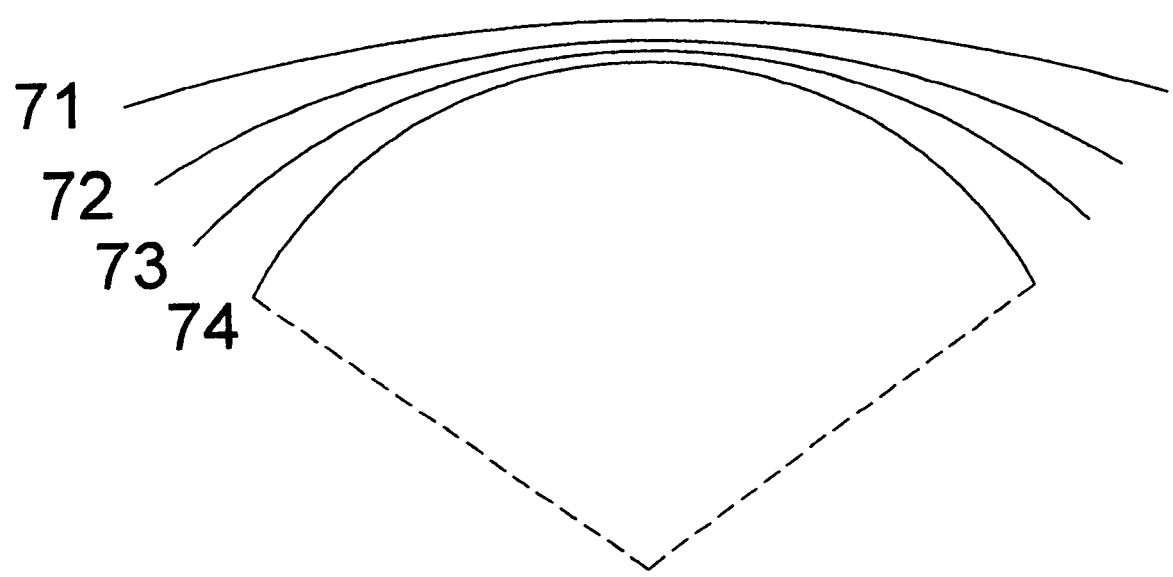
FIG. 7 shows several screen configurations of different radii that can be used in the practice of the invention, although other screen curvatures would also be suitable.

The actual amount of screen curvature is driven by the width of the auditorium. FIG. 7 shows several different configurations of curved screens, any of which could be suitable for use as part of this invention, under appropriate conditions. The curvature of the screens becomes deeper from slightly-curved screen 71, through more-deeply curved screens 72 and 73, through deeply-curved screen 74. The dotted lines in FIG. 7 demonstrate the wrap-around effect of a curved screen, where the angle subtended by the dotted lines is an obtuse one. The original Cinerama format featured a screen with 146° of curvature. Screens with this depth of curvature, or more deeply-curved, are suitable for use with the invention described. These are examples, since the correction feature of the invention renders essentially any practical screen radius suitable.

These screen designs are known in the art. Any of them, as well as a screen with a different curvature, can be used in the practice of the invention, depending on the limitation of the width of the auditorium. These examples should be thought of as illustrative and not limiting. It is also possible to use a screen with a non-linear compound curvature, with different degrees of curvature for different portions of the screen. The correction software used in this invention provides a distortion-free image on any curved screen, regardless of its specific configuration. In the practice of the invention, the actual amount of screen curvature is not as critical as the width of the image that can be projected onto the screen. The object of the invention, to allow wide-screen floor-to-ceiling and wall-to-wall presentation, in the native aspect ratio, in an auditorium that would not be large enough to support such presentation without the invention, is critical.

The invention uses digital projection technology. Since it concerns exhibition, the method of image capture that was used when the motion picture was photographed is not critical, as long as image quality is sufficient to support the immersive audience experience which the invention delivers. Motion pictures that are exhibited according to the invention can be animated, photographed digitally, or photographed on film and transferred to digital files. The images that comprise the motion pictures exhibited according to the invention must be free of artifacts and contain sufficient resolution to support an immersive presentation that delivers the picture-dominance effect on the viewers, while retaining maximum image clarity. The 4K digital exhibition format is used in the preferred embodiment of the invention, although the invention would also be adaptable to other formats and other methods of image capture that could be introduced or perfected in the future.

The digital processor used in the invention is designed to create a screen image that is free of artifacts and distortion onto a curved cinema screen. The Image AnyPlace-200 video and graphics scaler, manufactured by Flexible Picture Systems, Inc. of Richmond Hill, Ontario, and the Pixelwarp Keystone correction software, successor to Pixelwix Immersiview, manufactured by Pixelwix.com of New Port Richey, Fla., are suitable in the preferred embodiment of this invention. The chip used for projection must also have sufficient capacity to retain all of the image information that is present on the digital cinema file being displayed. Any other products that perform the same function are also suitable.

Figure 8:
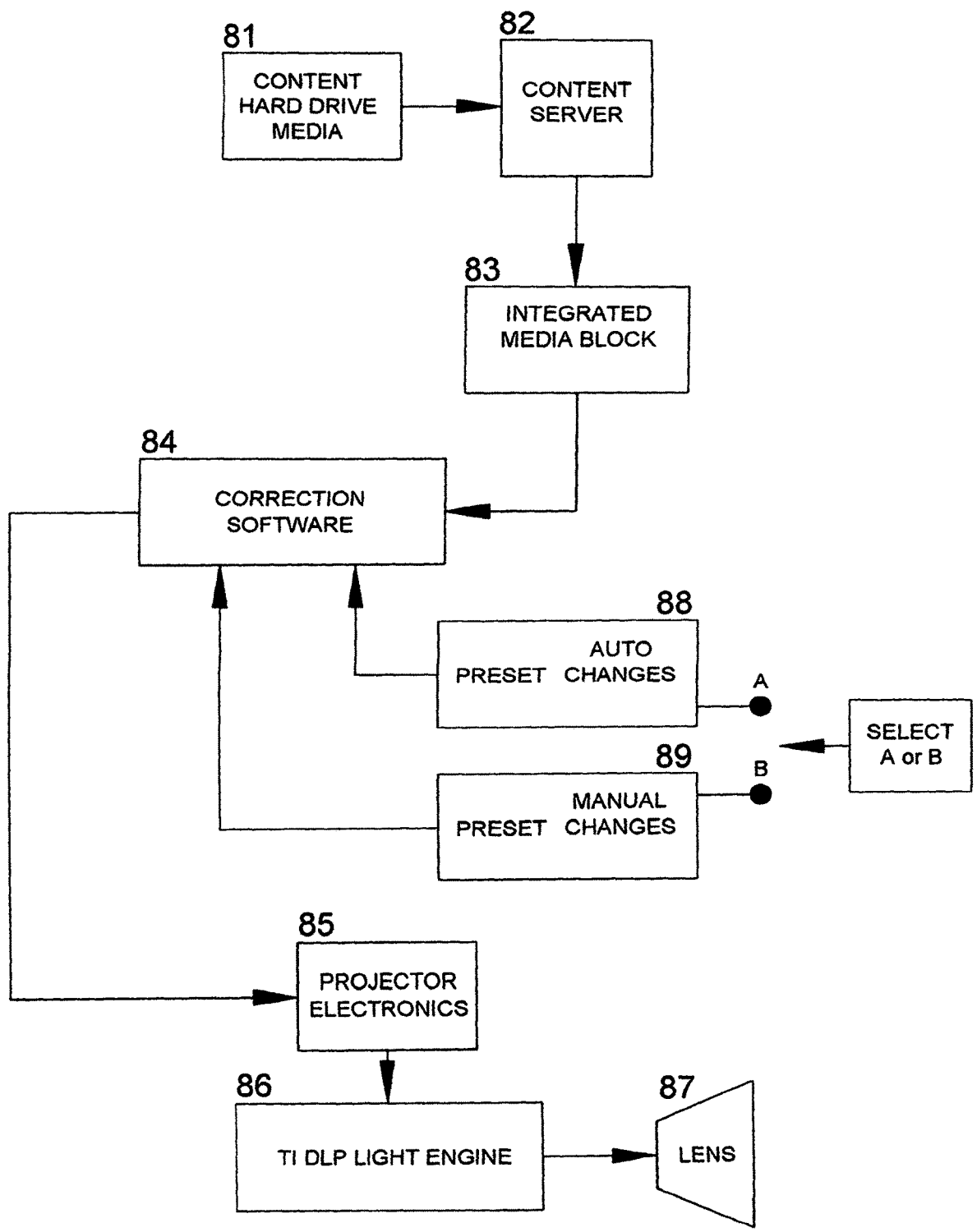
FIG. 8 is a flow chart that shows how the information needed to display motion pictures according to the invention reaches the projector. This includes the correction used to eliminate keystoning, droop, and elliptical corner distortions, as described.

The information and projection path for the motion picture information, as displayed to the audience, is shown as a flow chart in FIG. 8. The invention can be described either as a method or as a system, and FIG. 8 is described in terms of a method first. It treats the motion picture digital file, which the theater using the invention has received from the studio and has placed onto hard drive 81. This file is part of the standard Digital Cinema Initiatives (DCI) content package. The file is then transferred to content server 82. This is the location within the auditorium's projection system where it is stored for display when needed. The content server can be placed in the projection room itself, or in a central location in the theater complex. The file is then decrypted for exhibition at media block 83. This step is necessary, because studios distribute motion picture content files in encrypted form for security purposes. All these features exist in the prior art. The authorized file is then processed through correction software 84 and afterward directed to projector display electronics 85. Correction software 84 can also be incorporated directly into projector display electronics 85 as a module, by the manufacturer of the projector. It is correction software 84 that modifies the picture information to send each pixel thereof to the precise location on the screen where it will be seen as part of a distortion-free image, custom-corrected for the shape of the screen, as previously described.

Information from correction software 84 is fed to projector display electronics 85 at the correct point, so all the picture information is used to direct each pixel of each frame of the motion picture being displayed according to the invention to the correct location on the screen. This makes the motion picture appear distortion-free on the curved screen in use at the particular auditorium in which the invention is installed. The corrected picture is then shown by digital projector 86 through lens 87, which can be either spherical or anamorphic. The specific information applied by correction software 84 changes as the program content changes from one aspect ratio to another, either automatically 88, or under the manual control of an operator 89.

FIG. 8 can also be explained as a system, rather than as a method. The motion picture to be displayed according to the invention is obtained from the studio as a data file on hard drive 81, and then transferred to content server 82. The file is then decrypted for exhibition in media block 83. It is then fed through correcting software 84 to projector electronics 85. As previously described, this geometry correction is accomplished through novel use of mapping software, which directs each pixel of each image of the motion picture to the correct place on the screen. This correction straightens horizontal and vertical lines, as well as the spacing between vertical lines at center or side locations on the screen, such that the viewers of the motion picture observe an image that appears geometrically correct when projected onto the screen. In other words, the correction added to the picture information compensates for the curvature and shape of the screen, as well as the geometric features of the auditorium in which the invention is installed. The result is that a distortion-free picture, as the audience perceives it, filling the appropriate aspect ratio, is always delivered to the viewers. Whether described as part of a method or as part of a system, correction software 84 works the same way and accomplishes the same purpose. As previously described, it can also be incorporated into the projector's display electronics 85 as a module.

With this correction made and the motion picture file is corrected and fed through projector electronics 85, light from light source 86 is used to project it through lens 87, to the audience. In the preferred embodiment of the invention, light source 86 is a DLP Light Engine, as developed by Texas Instruments Company. As described elsewhere in this document, light source 86 is sufficiently powerful to deliver 14 to 22 foot-lamberts of light onto a zero-gain matte screen with appropriate curvature.

The correction information is added to the motion picture file by correction software 84. Correction software 84 is calibrated by a manual process for each aspect ratio supported by the invention for motion-picture content that is displayed in the auditorium in which the invention is installed. As shall be described, once correction software 84 is calibrated for each aspect ratio, it directs each pixel of every image which comprises the motion-picture content to its optimal place on the screen. Correction software 84 is pre-set for each specific aspect ratio but, once it is calibrated, the aspect ratio can be changed between one motion picture and the next, during a theater program. These pre-sets can be changed either automatically 88, or manually by an operator 89.

In the practice of prior-art high-impact exhibition systems using curved screens, it was necessary to make custom prints of films for exhibition with those systems. Because conventional projectors are located above the horizontal center line of the screen, they throw light onto the screen at an angle. This off-axis projection introduces image distortions such as keystone and droop distortion. Cinerama solved that problem by installing three projection booths at the level of the center line of the screen, but it is an object of this invention to avoid the high cost of installations required for such a non-standard system, and to avoid the need to correct the digital motion-picture file before it is distributed to the theater for exhibition. Further, display on a curved screen gives the appearance that the content at the edges of the image are spread out, compared to the content at the center of the image. Other distortion artifacts were described earlier in this document, and the invention also corrects the image to eliminate these artifacts.

This problem is solved by the novel use of mapping software, which has not heretofore been used in motion picture theaters. In the prior art, such software was used for simulators and for multi-screen presentations. In the present invention, the mapping software corrects the trajectory of each pixel as it leaves the projector and heads toward the screen. With the ability to control the trajectory of each pixel in this manner, the invention corrects for each of these sources of distortion, with the result of displaying a distortion-free picture to the audience. Since each auditorium is different from others, it is necessary to program the appropriate corrections into the mapping software for the theater in which the system is installed. Once the corrections are programmed for each aspect ratio that will be accommodated in the theater, there are no further changes required. Every motion picture shown in the theater, regardless of aspect ratio, would be free of distortion. Pixelwarp Keystone correction software from Pixelwix.com of New Port Richey, Fla. or proprietary software used with the Image AnyPlace-200 manufactured by Flexible Picture Systems, Inc., as mentioned previously, is suitable for this use, as are similar products that perform the same function.

Figure 9:
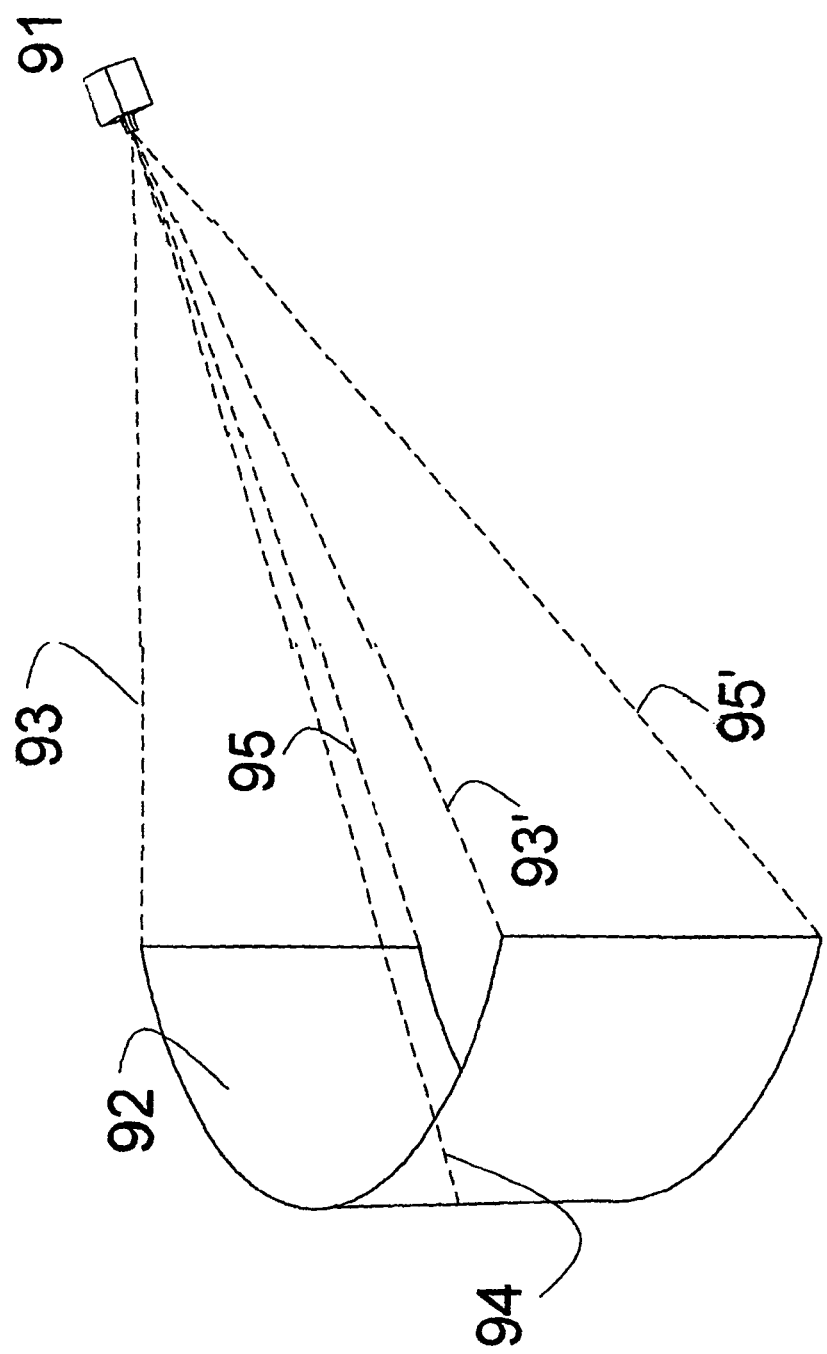
FIG. 9 shows the projected image of pixels from a digital projector onto a curved screen, demonstrating the condition of image distortion which the present invention corrects.

FIGS. 9 through 12 demonstrate pictorially how the correction method is used in the practice of the invention. The artifact eliminated by the correction method is shown in FIG. 9. During the exhibition of a motion picture, digital projector 91 projects the images which form the motion picture being presented. These images are displayed on curved screen 92. Because the location of projector 91 in nearly every commercial motion picture theater is above the "horizontal" midline of the screen, there is a downward component to the trajectory of the source image, as it is projected onto curved screen 92. Lines 93 and 93' represent the distance from projector 91 to the upper corners of screen 92. Line 94 represents the distance from projector 91 to the exact center of screen 92, and lines 95 and 95' represent the distance from projector 91 to the lower corners of screen 92. Due to the orientation of projector 91, lines 95 and 95' are longer than line 94, which is itself longer than lines 93 and 93'. The additional distance that the image must travel to reach the bottom of screen 92, compared to the distance to the top of screen 92, results in keystone distortion. Keystone distortion would also be present on a flat screen but would be significantly easier to mask than on the curved screen used in the invention.

Figure 10:
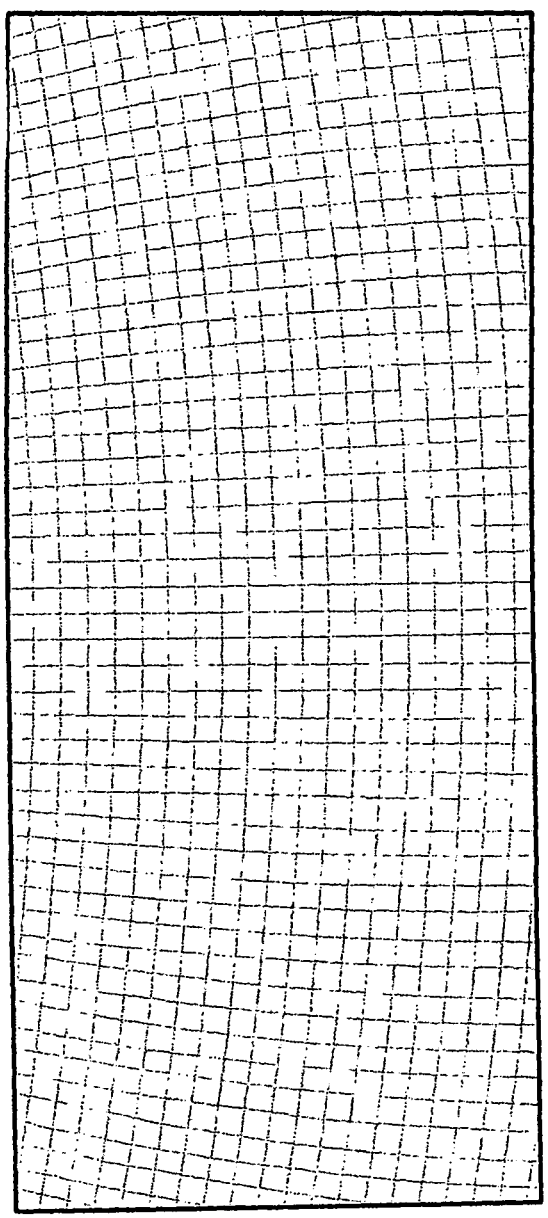
FIG. 10 shows how horizontal and vertical lines would appear on a curved screen as used in the invention, in the absence of the correction method described.

As a result of screen curvature, horizontal and vertical lines that would appear straight and orthonormal on a flat screen do not appear that way on the curved screen used in the practice of the invention. FIG. 10 is a simplified representation which shows how such lines, which are horizontal or vertical as they emanate from the projector, appear on a curved screen in the absence of the correction method described in this invention. The vertical lines near the center of the screen appear straight, but other vertical lines from the source image become non-linear, with increasing convexity toward the sides of the screen. Horizontal lines are not straight as projected onto the screen, either. They curve with an upward component toward the sides of the screen. This is not desirable.

Figure 11:
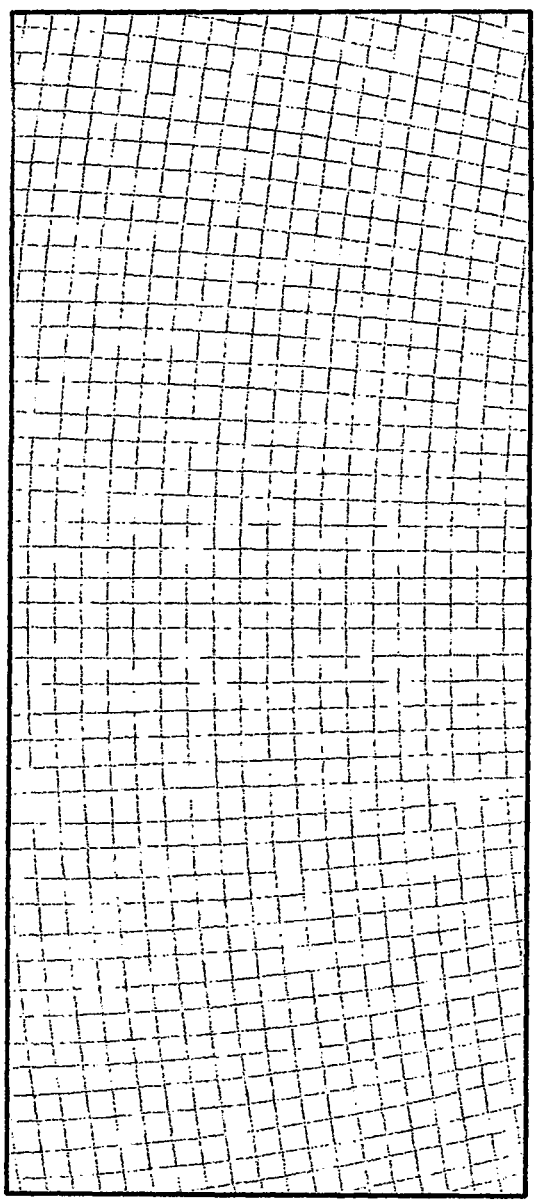
FIG. 11 shows a representation of the inverse of the appearance of FIG. 10, to illustrate what must be done to horizontal and vertical lines, in order to correct the image and eliminate distortion.

FIG. 11 represents a pattern inverse to the distorted image of FIG. 10; essentially a map of the correction that is imparted to the images as projected in the practice of the invention. While such a pattern would never actually be shown on a screen, FIG. 11 represents what the mapping software used in the invention accomplishes to place the pixels into their proper places on the screen. The keystone effect is reversed, and horizontal lines become coincident to the radius of the screen. For example, the horizon as photographed will appear to bend downward, as naturally observed in accordance with the curvature of the earth, rather than upward, in accordance with keystone distortion on a curved screen.

Figure 12:
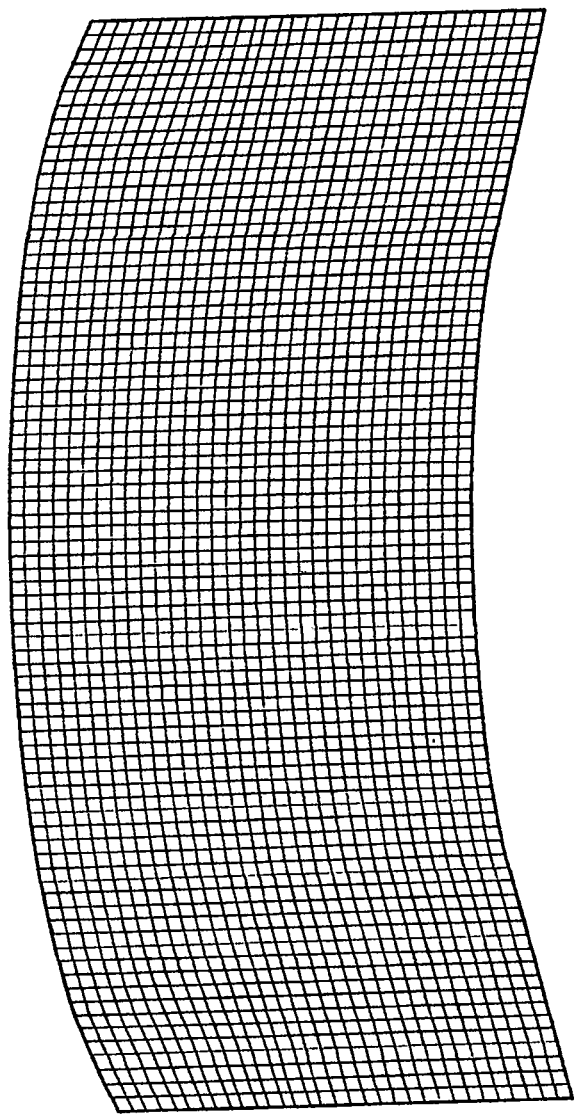
FIG. 12 shows the result of the correction process; horizontal and vertical lines forming an orthonormal linear grid, as it would appear from the audience's point of view, on a curved screen.

In the practice of the invention, an operator manages the software application from the central part of the auditorium, to eliminate the distortion shown in FIG. 10. The result is shown in FIG. 12. All vertical lines appear vertical and straight. All horizontal lines adhere precisely to the curvature of the screen. From the standpoint of the non-linear geometry of the screen, the horizontal and vertical lines form an orthonormal grid of apparently straight lines, when seen on the curved screen by viewers in the motion picture auditorium in which the invention is employed.

In effect, the mapping software directs each pixel of each frame of the motion picture being displayed to the correct location on the screen, either automatically or manually. Because each pixel is sent to its target location separately, it is re-positioned correctly, so distortions customarily associated with the geometry of the auditorium, location of the projector or curvature of the screen, are nullified. The software corrects for these potential sources of image distortion and generates an image that appears as it would have appeared on a flat screen. In other words, the picture presents the appearance of an image formatted specifically for the auditorium in which it is displayed.

In the practice of the invention, the software is used to direct each pixel to its proper place on the screen. This "proper place" is selected to correct for the configurations of the screen and the auditorium, as described. To prepare the software for this task, it is programmed manually to accommodate each possible motion picture format that could be exhibited in the auditorium; one aspect ratio at a time. This manual programming is performed by an operator while seated in the central part of the audience seating area. This optimizes the linearity of the image for the audience's point of view, because the operator sits in an optimal location in the center of the place where the viewers will sit later, when the motion pictures are presented to the viewers in the theater.

For a selected aspect ratio, the operator uses the testing function incorporated into the software to straighten the appearance of horizontal and vertical lines on a test grid, when projected onto the screen. As these lines are straightened, and this straightening is fine-tuned through a feedback means built into the software, it is adjusted to generate completely straight and sharp horizontal and vertical lines for such projection. The eventual result is a grid that is completely orthonormal in appearance and whose lines are also adjusted to appear equally-spaced at all locations on the screen. The audience would observe that all horizontal lines appear to run the entire width of the screen, and appear completely linear. Thus, even though the grid is projected onto a curved screen, it appears as it would, if it had been projected onto a flat screen. After this correction is made, motion picture content also assumes a similar appearance.

The software also has the feature that it can alter the image in a downward direction, when it is projected onto the screen. This fills the areas that would otherwise not contain picture information, due to keystone distortion; commonly known as the "smile" effect. It also alters the image to make horizontal lines appear straight, resulting in a natural depiction of those lines, straight across a curved screen. O'Brien 746 (Todd-AO) taught a method for making this correction optically, but with great difficulty, and only for the Todd-AO aspect ratio of 2.20:1. In this invention, the same correction is made digitally, with better image quality at any aspect ratio. That is the correction feature that eliminates undesirable keystone and droop distortions.

Once this correction is accomplished manually for each aspect ratio, it is pre-set on the memory card or other device that controls the automation in the auditorium. Then the operator repeats the process for another aspect ratio, until corrections are programmed into the computer for all desired aspect ratios. A further programming function adds signals which indicate that a motion picture is concluding and directs the operating hardware to select a different pre-set, which corresponds to the aspect ratio in which the next segment of content is to be displayed (see FIG. 8). Along with this, the operating hardware is also cued by a programmed signal to move the screen masks or curtains in preparation for the change of aspect ratio, if they are used at that location. While all of this is pre-programmed for automatic operation in the preferred embodiment of the invention, these events can also be controlled manually.

It is a novel feature of this invention that motion pictures in any format, with any aspect ratio, can be exhibited as components of a single program, if desired. In the practice of the invention, horizontal screen masks that accommodate a specific aspect ratio move automatically, as actuated by cues placed in the software the controls all auditorium automation. This can be accomplished through methods known in the art. For example, Vetter taught screen-masking methods in U.S. Pat. No. 3,475,086 but did not include a movable lower screen mask. Weisgerber taught the use of a movable lower screen mask for a curved screen in U.S. Pat. No. 5,121,977. With all four screen masks being movable for different image sizes and aspect ratios, it is now possible to correct for any projected screen distortions having to do with linear images. It is not necessary to utilize the full potential of the invention at all times, but a corrected image is obtainable with this invention for any image size or aspect ratio displayed. When the invention is installed in an auditorium, that venue can still be used to exhibit "conventional" motion pictures, even those in historic film formats such as the Edison aspect ratio of 1.33:1 or the Academy aspect ratio of 1.37:1 as an option, when the entire height of the screen might not be used, and only half of the available screen width might be utilized. When a motion picture is exhibited in such a theater using the invention described, the bright illumination available through digital projection onto a matte screen, along with the correcting feature that eliminates distortion stemming from the geometry of the auditorium combine to deliver a high-quality, immersive presentation. The quality of this presentation still exceeds that available with the original film format and under traditional exhibition conditions.

As mentioned previously, a DLP chip, as used in this invention, contains a light source and a micro-mirror for each pixel that can be projected onto the screen. For 4K digital projection, that includes 4096 pixels in the horizontal dimension and 2160 in the vertical, for a total of 8,847,360 pixels at an aspect ratio approximating 1.9:1. In the practice of this invention, not all these light sources and mirrors are necessarily active for certain aspect ratios, although the entire chip is active in the preferred embodiment of the invention.

The current Digital Cinema Initiative (DCI) standard calls for wide-screen content to be presented in letterbox format.

This results in reduced pixel count and, therefore, in reduced resolution and brightness from the DLP projector chip. By using anamorphic compression, the invention can utilize the full capability of the DLP "light engine" chip. For a widescreen presentation with the aspect ratio of 2.40:1 (that of CinemaScope) in a letterbox format, the full height of the chip (2160 pixels) would be used, with images that had been anamorphically compressed for storage and re-expanded when projected through an anamorphic lens. To use the full native capacity of the 4K chip, the entire height of 2160 pixels is used, and the images are anamorphically squeezed horizontally to fit all the picture information onto 4096 pixels of width. Storing an image with a 2.40:1 aspect ratio on a chip with a native aspect ratio of 1.9:1 requires a 26.3% squeeze. Wider aspect ratios require more compression; 40% for the 2.66:1 projected aspect ratio of Ultra Panavision-70 and 45% for the 2.76:1 of MGM-65. For narrower aspect ratios that can be accommodated with a spherical projection lens, the anamorphic projection lens objective is mounted on a sled and can be easily moved laterally to or from the front of the prime lens of the projector as aspect ratios change, by means known in the art. It is also contemplated that a variable anamorphic lens can be used as part of the invention.

There is no resolution lost in the original anamorphic compression of the images onto the DLP chip used in the projector, because the content is sent in compressed format for exhibition. While some light is lost in projecting the anamorphically-expanded image, there is less light lost than by reducing a wide image to letterbox format on the chip, which leaves a portion of the chip inactive and, therefore, unable to contribute light for projecting the images. The DCI Widescreen standard for the 2.4:1 aspect ratio calls for use of only 1716 or the 2160 available rows, each 4096 pixels wide, yielding an aspect ratio of 2.39:1. That means only 79.4% of the available space on the chip is used, which also means that slightly more than 20% of the available light-generating capacity is sacrificed. With wider aspect ratios such as 2.66:1, even more light capacity is lost, as is significant resolution. The invention described here uses the entire 4K chip, so there is no loss of resolution; in contrast to the result from using a spherical letterbox format as called for in the DCI standard.

The entire horizontal pixel count of 4096 would remain in use with the 4K format, and the screen masking would be set to reveal enough of the screen at the peripheral edges to accommodate the aspect ratio of the format in use. The masks can be moved by cue signals in the software of the content, or they can be manually adjusted, as known in the art. It should also be noted that the invention is compatible with use of a spherical lens, or in combination with an anamorphic expansion lens on the projector. Since aspect ratios can change during a program in the practice of the invention, it is also feasible to change the magnification of the spherical lens, as well as removing the anamorphic lens through mechanical means, as desired.

Some aspect ratios are more common than others, and the invention programs the software to accommodate several preset aspect ratios. It adjusts for geometry, as well as controlling the lens system of the projector to fill the appropriate part of the screen. In the preferred embodiment of the invention, there are six such preset aspect ratios, but that number should not be considered as a limit. The change of aspect ratios in accordance with format changes can also be accomplished manually. The chip can accommodate each of these aspect ratios through methods known in the art.

The present invention constitutes an improvement over the prior art, because the system can change from one aspect ratio to another, without any distortion caused by keystoning or image droop on a curved screen. Keystoning exists as a problem, even today, on a flat or moderately-curved screen. It is more severe on a radically-curved screen, where droop distortion also becomes an additional artifact. The mapping software used in the practice of the invention eliminates image distortion by correcting for the geometry of the screen and the auditorium. This correction changes from one aspect ratio to another. Consequently, in the preferred embodiment of the invention, several presets are programmed into the operation of the projection system, so motion pictures can be displayed in any one of a number of aspect ratios; all fully-corrected to eliminate image distortions such as keystoning and droop distortion. As mentioned previously, this programming can work in conjunction with the screen-masking system, as directed by the automation system in use in the auditorium when the invention is installed. The automation can be activated by digital cues in the content software or in the program that operates the auditorium's automation system, or it can be accomplished manually.

It is another important feature that the invention described can accomplish these and other operations automatically. Pre-coded signals are embedded into the timed programming of the computerized control for the projector. These signals can be embedded by any means known in the art. As one motion picture ends, the code activates the events that prepare the system to display the next motion picture on the program. In response to a signal, the chip activates or de-activates some of the surface used to project the pixels which comprise the image onto the screen and prepares to begin displaying the next motion picture in the program sequence. Also in response to the signal, if the next motion picture is to be displayed in a different aspect ratio than the previous picture, the motors which move the screen masks are activated. The screen is then prepared to receive images from the new motion picture at the new aspect ratio. As mentioned previously, the screen masks are moved automatically, by means known in the art.

While events of this type can also be controlled manually as desired by the user of the invention, the feature that allows them to be triggered automatically is an important feature of the invention described. This feature is shown on FIG. 8, the flow chart for the invention. Programmed automatic operation is indicated by 88, while manual operation is indicated by 89 on that drawing. Under automatic operation, there is no need for a projectionist to watch and operate the system in each auditorium at all times, so a single projectionist can manage the equipment in more than one auditorium in a multiplex theater complex.

The invention is equally useful for displaying a two-dimensional (2D) or three-dimensional (3D) presentation, and delivers the desired effect with either, and without geometric distortion. It is compatible with 3D exhibition methods used in the prior art, with the use of a curved screen, high-brightness digital projector and correction feature, as with 2D exhibition. Because of the zero-gain matte screen used in the invention, "active" glasses, with a switching means contained in the glasses themselves, are suitable for use with it. The Dolby Vision 3D system, which uses different RGB primaries for each eye and notch filters to separate left-eye and right-eye images, is also suitable for use with this invention. The "passive" glasses that separate left-eye and right-eye components of a 3D image through polarization are not suitable for use with the invention, because that method requires a reflective screen, which is not suitable for the preferred embodiment of the invention.

The invention is also suitable for use with "stacked" two-projector installations, for 3D use, or for 2D use to produce a sufficiently bright picture on the screen. In these instances, the two projectors must be registered together, and the geometry correction described must be installed on both. This practice is known in the art.

With the use of the system described here in a motion picture theater, the installation of the curved screen and other components of the invention would not preclude the use of other features associated with contemporary high-impact motion-picture exhibition. The system accommodates high frame rates, such as the emerging forty-eight frames-per-second, or higher. Weisgerber taught a method for upgrading motion pictures originally photographed at 24 frames-per-second for exhibition at 48 frames-per-second by rendering new images for insertion between each image of the original motion picture and its successor, U.S. Pat. No. 9,277,169. Frame rates from 30 to 120 frames-per-second can be used with high-frame-rate digital cinema projectors, and this invention is compatible with any such frame rate.

The use of this invention in conjunction with exhibition at 48 frames-per-second in 4K format will deliver the equivalent spatial resolution of 8K projection onto the curved screen as used in the practice of the invention. With the teachings of Weisgerber 169, it is now possible to upgrade any existing motion-picture content to the level of temporal and spatial resolution available with 8K digital projection. This applies to all motion pictures, whether they were originally photographed digitally or on film.

The invention described is a universal system and method that is suitable for delivering the most immersive "virtual reality" presentation available to an audience, regardless of the content of a motion picture or the format in which it is presented, and whether it was originally shot on film or digitally. It is compatible with all motion picture formats and aspect ratios. It can be used for 2D or 3D presentation if the digital projector used in the system can accommodate such a presentation. It can be used to display classic motion pictures that were originally photographed on film and later converted to digital format, in the original frame rate or a higher one. It can accept motion pictures that were produced or upgraded according to the latest methods, because it has the potential to maximize the desired immersive effect on the audience, no matter how the motion picture was photographed or treated during post-production. In effect, it is "future-proof" in that it will remain compatible with any motion picture system or format that is currently in use or may be used in the future. It does not inhibit the use of traditional motion picture formats, but it improves the quality of presentation of motion pictures produced in those formats. For contemporary formats which take full advantage of today's technology, it embellishes, enhances and improves the presentation of such motion pictures and the experience it delivers to the audience.

While the preferred embodiments of the invention have been shown and described, these should be thought of as lying within the scope of the invention. The descriptions contained here should be thought of as illustrative, and not limiting. Other embodiments are possible, and they should also be considered as lying within the scope of the invention.

The invention claimed is:

1. A method for exhibiting motion pictures of varying formats utilizing different aspect ratios in auditoriums located in motion-picture theaters, comprising:
projecting said motion pictures from a single-source digital projector onto a curved screen;
changing from one format utilizing a certain aspect ratio to another format utilizing a different aspect ratio during the course of a motion-picture program presentation;
eliminating image distortion by correcting for a characteristic of said auditorium and a characteristic of said screen for each format in which said motion pictures are displayed and the aspect ratio utilized by each of said formats; wherein the width of the images of which said motion pictures consist, as viewed by said audiences along an arc subtended by a chord of said screen, exceeds the width of the rear wall of the said auditorium;
providing a screen brightness in excess of 14 footlamberts, and up to 22 foot-lamberts;
further comprising changing formats during the course of a theatrical motion presentation through the use of a computer program, in which said change between formats utilizing different aspect ratios is activated by commands embedded into said computer program which forms part of the automation system which controls said projector;
in which said commands embedded into said computer program also contain correction information which customizes the projection of each pixel of each image of said motion pictures onto said screen, in a manner that eliminates keystone and droop distortion;
in which said correction information is embedded into said computer program, such that said customization changes as part of said change of formats with different aspect ratios; and
in which said customization is accomplished manually for each format and aspect ratio and on a one-time basis by an operator inside the theater in which the invention is installed visually inspecting a test image or images projected onto said screen and manually imparting commands to said projection system to correct said test image or images, imparting commands to said projection system to correct said test image or images, such that all horizontal and vertical lines on such test image or images appear straight and orthonormal as projected onto said screen; the information contained in said commands further being embedded into the software which controls said projection system as pre-set calibrations of said system for future exhibition of motion pictures in said theater for each of the formats and aspect ratios for which said calibrations were made; with the result that said images appear distortion-free to the viewers of said images in said theater.

2. The correction method in claim 1, which further results in the display of said images on said screen, whereby the curvature of said screen adds sufficient horizontal width to said images that the images thus corrected and displayed appear to viewers in said auditorium to exceed the physical width of the interior of said auditorium.

3. A theatrical motion-picture exhibition system comprising:
a curved screen upon which motion pictures are projected;
a single-source digital projector which projects the images of said motion pictures onto said screen;
a module within the projector/projection software for switching between one motion-picture exhibition format utilizing one aspect ratio and another motion-picture format utilizing another aspect ratio in an automatic manner as the content of said motion pictures changes during the course of a motion-picture program presentation;

a module within the projector/projection software for automatically correcting the images of said motion pictures to eliminate image distortion due to the configuration of said screen and said auditorium;

a module within the projector/projection software for automatically correcting said images in response to changes in format and aspect ratio during a program wherein the width of the images comprising said motion picture as viewed by said audiences along an arc subtended by a chord of said screen appears to exceed the width of the rear wall of the said auditorium, in which said motion pictures are exhibited through said system, further providing a screen brightness in excess of 14 foot-lamberts, and up to 22 foot-lamberts;

further comprising a means for changing formats during the course of a theatrical motion-picture presentation through the use of a computer program, in which said means for changing between formats utilizing different aspect ratios is activated by commands embedded into said computer program which forms part of the automation system which controls said projector;

in which said correction information is embedded into said computer program, such that said customization changes as part of said change of formats with different aspect ratios; and in which said customization is accomplished manually for each format and aspect ratio and on a one-time basis by an operator inside the theater in which the invention is installed visually inspecting a test image or images projected onto said screen and manually imparting commands to said projection system to correct said test image or images, such that all horizontal and vertical lines on such test image or images appear straight and orthonormal as projected onto said screen; the information contained in said commands further being stored in the software which controls said projection system as pre-set calibrations of said system for future exhibition of motion pictures in said theater for each of the formats and aspect ratios for which said calibrations were made; with the result that said images appear distortion-free to the viewers of said images in said theater.

4. The correction system in claim 3, which further results in the display of said images on said screen, whereby the curvature of said screen adds sufficient horizontal width to said images that the images thus corrected and displayed appear to viewers in said auditorium to exceed the physical width of the interior of said auditorium.

* * * * *